(12) United States Patent
Ledwith

(10) Patent No.: US 9,460,831 B2
(45) Date of Patent: Oct. 4, 2016

(54) FLAT-FLEXIBLE CABLE AND APPARATUS

(71) Applicant: Panasonic Avionics Corporation, Lake Forest, CA (US)

(72) Inventor: Jon G. Ledwith, Palatine, IL (US)

(73) Assignee: Panasonic Avionics Corporation, Lake Forest, CA (US)

( * ) Notice: Subject to any disclaimer, the term of this patent is extended or adjusted under 35 U.S.C. 154(b) by 0 days.

(21) Appl. No.: 14/796,283

(22) Filed: Jul. 10, 2015

(65) Prior Publication Data

US 2016/0012941 A1 Jan. 14, 2016

Related U.S. Application Data

(60) Provisional application No. 62/059,400, filed on Oct. 3, 2014, provisional application No. 62/023,399, filed on Jul. 11, 2014.

(51) Int. Cl.

| | |
|---|---|
| *H02G 3/00* | (2006.01) |
| *H01B 7/00* | (2006.01) |
| *H01B 7/08* | (2006.01) |
| *B65H 75/44* | (2006.01) |
| *B65H 75/48* | (2006.01) |
| *H01B 3/42* | (2006.01) |
| *H01B 7/04* | (2006.01) |

(52) U.S. Cl.
CPC ........ *H01B 7/0838* (2013.01); *B65H 75/4428* (2013.01); *B65H 75/4449* (2013.01); *B65H 75/48* (2013.01); *H01B 3/421* (2013.01); *H01B 7/04* (2013.01); *H01B 7/0861* (2013.01); *B65H 2701/34* (2013.01)

(58) Field of Classification Search
CPC ...... H01B 7/0838; H01B 3/421; H01B 7/04; H01B 7/0861; B65H 75/4428; B65H 75/48; B65H 2701/34; B65H 75/4449
USPC ................... 174/70 R, 113 R, 117 F, 117 FF
See application file for complete search history.

(56) References Cited

U.S. PATENT DOCUMENTS

| | | | |
|---|---|---|---|
| 4,209,215 A | 6/1980 | Verma | |
| 5,535,960 A * | 7/1996 | Skowronski | H04M 1/15 191/12.2 R |
| 6,019,304 A | 2/2000 | Skowronski et al. | |
| 6,293,485 B1 | 9/2001 | Hollowed | |
| 6,372,988 B1 | 4/2002 | Burke et al. | |
| 6,386,906 B1 | 5/2002 | Burke | |
| 6,495,756 B1 | 12/2002 | Burke et al. | |
| 6,578,683 B1 | 6/2003 | Burke et al. | |
| 6,761,579 B2 | 7/2004 | Fort et al. | |
| 6,799,994 B2 | 10/2004 | Burke | |
| 6,896,543 B2 | 5/2005 | Fort et al. | |
| 7,108,216 B2 | 9/2006 | Burke et al. | |

(Continued)

*Primary Examiner* — Sherman Ng
(74) *Attorney, Agent, or Firm* — Brian Furrer

(57) ABSTRACT

A cord reel assembly described herein comprises a cord reel including a flat flexible cable that comprises a ribbon of generally parallel power transmission and data transmission wires embedded in a non-conductive polymeric matrix. Each data transmission wire is spaced and insulated from any adjacent wire by the polymeric matrix. The power transmission wires are flattened relative to the data transmission wires, and have a larger gauge than the data transmission wires. The FFC comprises non-shielded end regions flanking a shielded middle region that includes a shielding layer on at least one side of the cable, and a non-conductive coating covers the shielding layer.

23 Claims, 20 Drawing Sheets

(56) References Cited

U.S. PATENT DOCUMENTS

| | | |
|---|---|---|
| 7,172,150 B1 * | 2/2007 | Hutchison, II ..... B65H 75/4449 191/12.2 R |
| 7,242,299 B2 | 7/2007 | Kelsch et al. |
| 7,687,721 B2 | 3/2010 | Lietz |
| 7,692,099 B2 | 4/2010 | Burke |
| 8,075,335 B2 | 12/2011 | Burke et al. |
| 8,123,010 B2 | 2/2012 | Skowronski et al. |
| 8,123,836 B2 | 2/2012 | Kalous et al. |
| 8,345,398 B2 | 1/2013 | Mazzarisi et al. |
| 8,387,763 B2 | 3/2013 | Burke et al. |
| 8,435,069 B2 | 5/2013 | Burke et al. |
| 8,657,087 B2 | 2/2014 | Burke et al. |
| 2002/0040945 A1 * | 4/2002 | Stepancich ........ B65H 75/4431 242/378.1 |
| 2003/0192760 A1 | 10/2003 | Burke et al. |
| 2004/0200919 A1 * | 10/2004 | Burke et al. ....... B65H 75/4434 242/378.1 |
| 2006/0286861 A1 | 12/2006 | Avevor et al. |
| 2007/0074891 A1 * | 4/2007 | Burke ..................... H01B 7/06 174/113 R |
| 2010/0215327 A1 | 8/2010 | Braden et al. |
| 2011/0079676 A1 | 4/2011 | Skowronski et al. |
| 2012/0081816 A1 | 4/2012 | Mazzarisi |
| 2012/0126047 A1 * | 5/2012 | Skowronski ....... B65H 75/4449 242/388.6 |
| 2012/0149236 A1 | 6/2012 | Burke et al. |
| 2012/0168272 A1 * | 7/2012 | Skowronski ....... B65H 75/4423 191/12.2 R |
| 2012/0285723 A1 | 11/2012 | Gundel et al. |

* cited by examiner

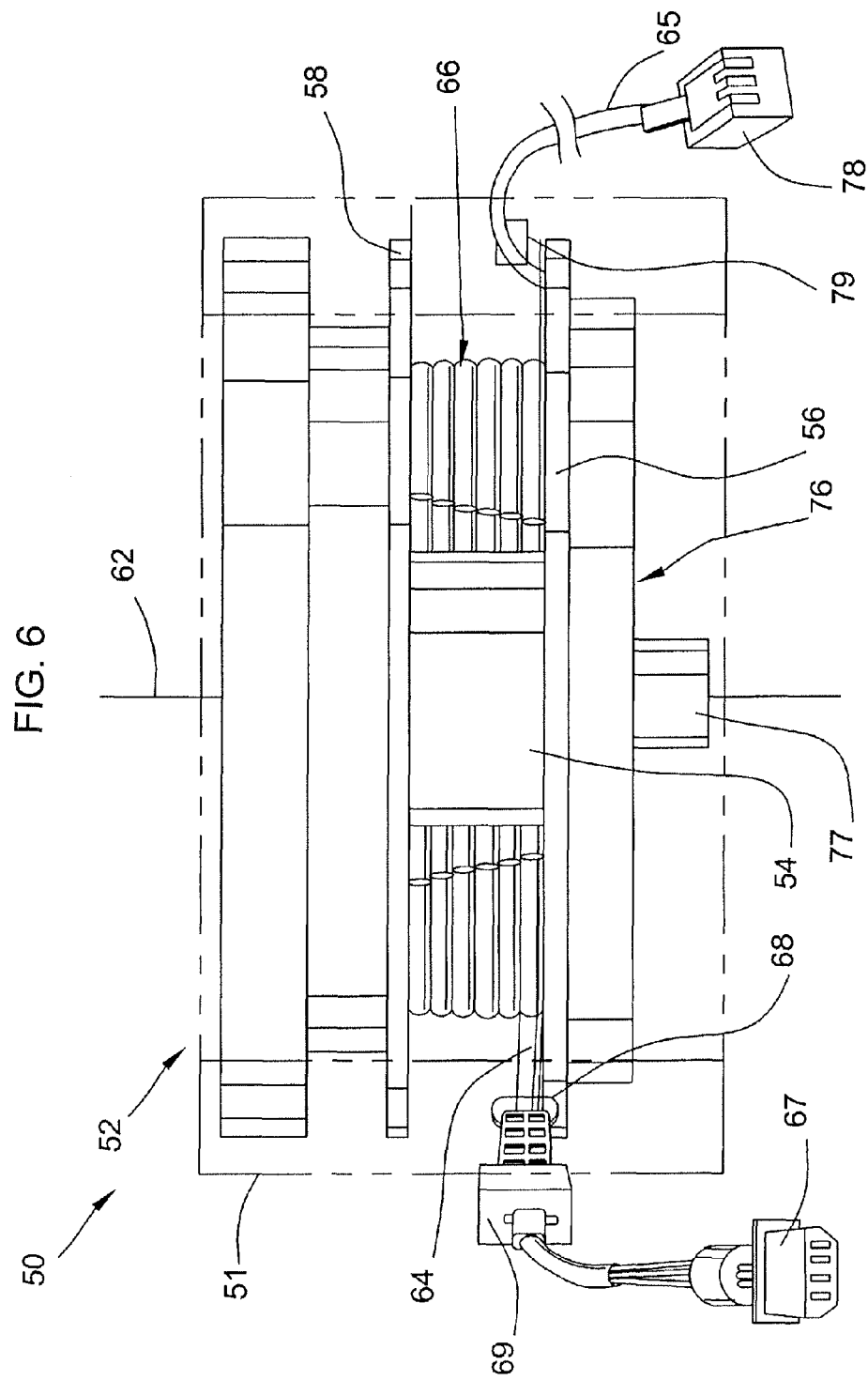

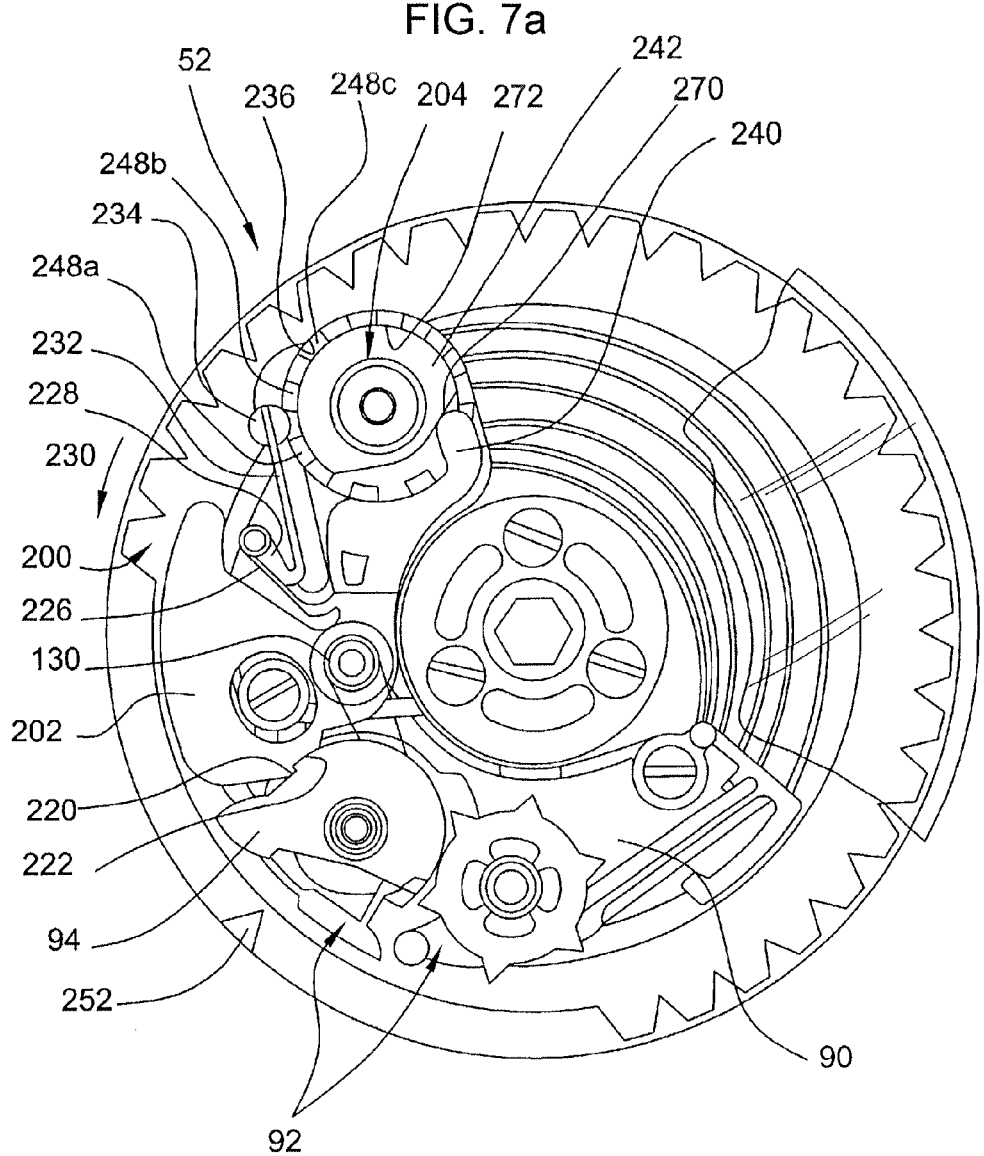

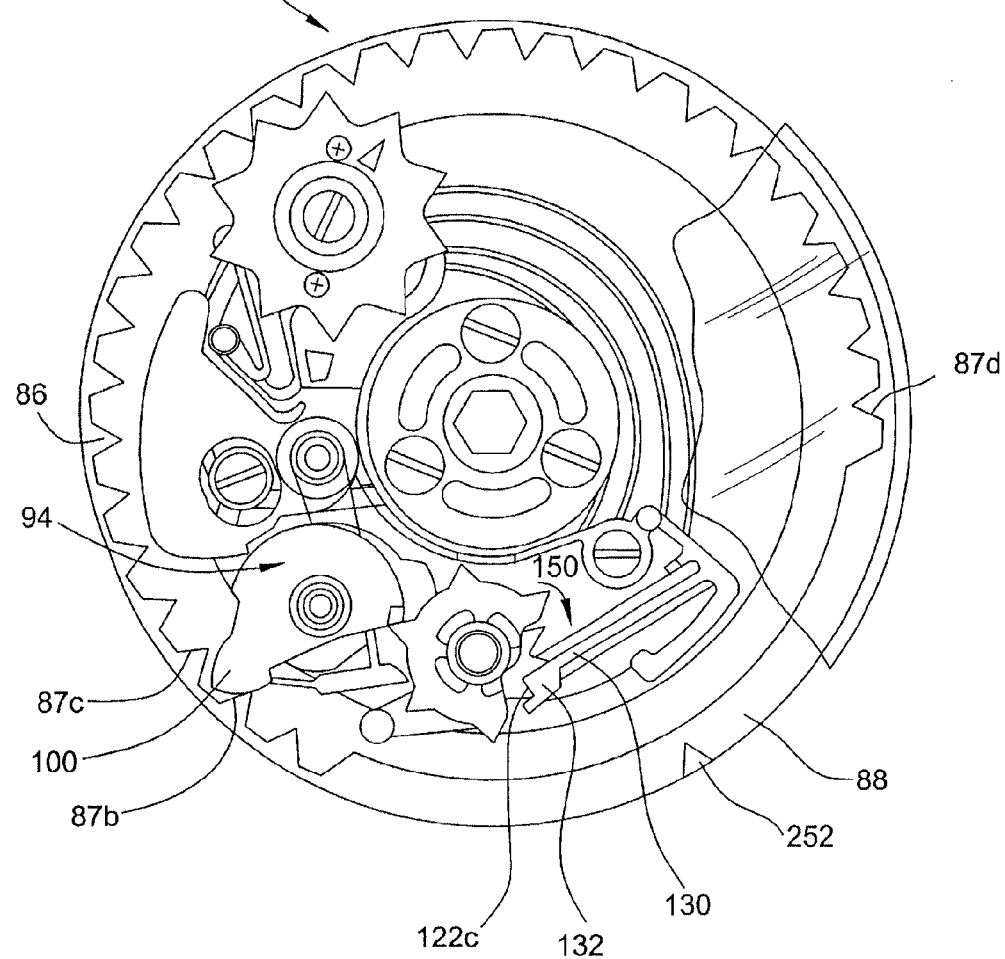

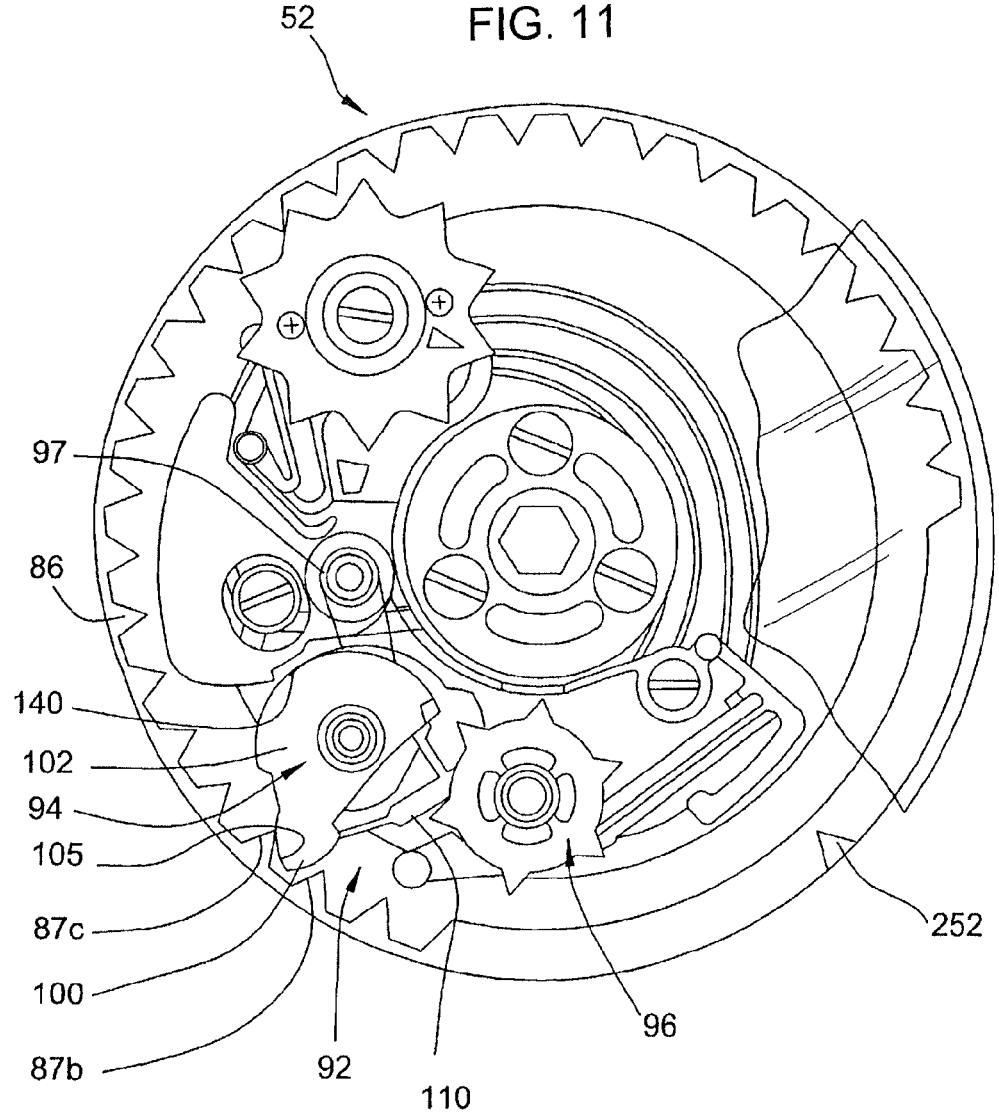

FLAT-FLEXIBLE CABLE AND APPARATUS

CROSS-REFERENCE TO RELATED APPLICATIONS

This application claims the benefit of U.S. Provisional Application Ser. No. 62/059,400 filed on Oct. 3, 2014, and claims the benefit of U.S. Provisional Application Ser. No. 62/023,399 filed on Jul. 11, 2014, each of which is incorporated herein by reference in its entirety.

FIELD OF THE INVENTION

The invention relates generally to flexible flat cable for electrical power and data transfer applications and to retractable cord reels comprising the cable.

BACKGROUND OF THE INVENTION

Retractable cord reels have been widely used in many applications, especially in telephonic applications. In some cord reels, the reel is spring biased so that the cord is under a constant tension when a length of cord is pulled from the reel, and automatically rewinds back onto the reel when tension is released. In other designs, the reel includes a catch or latching mechanism so that certain lengths of cord can be unwound from the reel and can be utilized without the withdrawn cord being under constant tension. Such reels also include a mechanism for automatically rewinding the cord back onto the reel when the device is no longer in use.

Many cord reels utilize a coil of flat flexible cable (FFC) as part of the data transmission circuit in the device (see e.g., U.S. Pat. No. 6,293,485 to Hollowed for one such reel design). Some forms of conventional FFC generally comprises a number of fine wires embedded within a polymeric matrix. Typically, the wires are laminated between one or more layers of a dielectric polymer sheet material, such as a polyester. Typically all of the wires are of the same size across the entire cable width. In other forms of FFC the wires are actually printed metallic traces (i.e., the FFC is a flexible printed circuit board).

Currently, FFC can be manufactured with a cable width and thickness suitable to meet USB 1.1 standards for data transmission but still fit within a relatively compact cord reel apparatus that can be conveniently mounted in, e.g., an airline seat back for use in conjunction with a telephone or game controller by passengers in flight. There is an increasing demand for corded devices that utilize a cord reel that meets USB 2.0 or higher standards for data and power transmission (i.e., battery charging). Conventional FFC meeting the USB 2.0 standard require a much larger cable width and/or cable thickness than required for USB 1.1 standards, due to the higher currents required for battery charging and higher data transmission rates (i.e., more wires and/or wires of greater diameter are required to meet the standards, which were designed primarily for round cable implementation, rather than FFC implementation). This greater cable size can be a problem in cord reels for use in airline seat back devices, for example, which have a limited space available to accommodate the cord reel.

The FFC and cord reels described herein address the shortcomings inherent in current conventional FFC designs for use in USB 2.0 applications.

SUMMARY OF THE INVENTION

A flat flexible cable is described herein, which comprises a ribbon of generally parallel wires embedded in a non-conductive polymeric matrix. In particular, the FFC comprises spaced power transmission wires and data transmission wires. Preferably, the FFC comprises two or more power transmission wires (e.g., two to six power transmission wires) and two or more data transmission wires (e.g., two to ten data transmission wires). Each individual data transmission wire is spaced from adjacent data transmission wires and adjacent power transmission wires by a portion of the polymeric matrix. The FFC comprises non-shielded end regions flanking a shielded middle region that includes a shielding layer on at least one side of the flat cable. In some embodiments, only one side of the middle region of the FFC is shielded by a metal-containing shielding layer deposited on the polymeric matrix. The shielding layer may be in electrical contact with at least one of the data transmission wires at one or more spaced locations along the length of the middle portion of the FFC in order to provide a signal reference, a signal guard, and/or a contiguous shield electrical connection. A protective, non-conductive coating covers the shielding layer. The polymeric matrix is absent in a portion of the non-shielded end regions so that the wires can be placed in electrical contact with a circuit, a connector, and the like. The wires can be spaced at any desired pitch, so long as there is sufficient polymeric matrix present between the wires to electrically insulate the wires from each other. The number, gauge, and pitch of the various wires is selected based on the data and power transmission requirements for the application in which the FFC will be utilized, as will be readily understood by a person of ordinary skill in the electrical arts.

The power transmission wires of the FFC have a greater cross-sectional area than the data transmission wires (i.e., the power transmission wires have a larger gauge than the data transmission wires), and therefore have greater current carrying capacity. The data transmission wires can be generally circular in cross-section, as in conventional single strand wires, whereas the power transmission wires are flattened, and have a greater width than thickness. The initial thickness of the power transmission wires is generally greater than or equal to the diameter of the data transmission wires. In some embodiments, the thickness of the power transmission wires is approximately equal to the diameter of the data transmission wires. In some embodiments, all conductors are flattened, the power conductors more so than the data conductors.

As used herein in reference to the FFC, "length" refers to the end to end distance in the direction in which the generally parallel wires run, "width" refers to the dimension perpendicular to the length in a plane defined by the wires, and "height" or "thickness" refers to the dimension perpendicular to the width and the length of the FFC.

In a preferred embodiment for USB 2.0 applications, the FFC is about 54 inches long, and about 0.4 inches wide. The FFC includes four power conducting wires that are about 0.005 inches thick and about 0.03 inches wide arranged in two pairs along each edge of the FFC ribbon with eight round data transmission wires having a diameter of about 0.006 inches symmetrically arranged between the pairs of data transmission wires as illustrated e.g., in FIG. 1. The polymeric matrix comprises two sheets of polyester material on one side the wires and two sheets of polyester material on the other side of the wires, each sheet being about 0.0035 inches thick, and laminated together around the wires. The shielded middle region of the FFC is about 53 inches long with non-shielded end portions flanking the middle portion on each end. Approximately 0.1 to 0.125 inches of the wires are bare in the non-shielded end regions to facilitate connection to a circuit. The FFC includes a shielding layer in the form of a silver paint coating approximately 0.001 inches thick over one side of polymeric matrix in the middle region, with the coating of silver paint contacting the outer two data wires at several locations via apertures cut out of the polymeric matrix down to the wires. A protective conformal coating, about 0.001 inches thick, covers the shielding layer.

In another aspect, a selectively retractable cord reel assembly is provided which incorporates an FFC cable as described herein. The spring biased cord reel assembly includes a mechanism for selectively enabling and disabling a latch mechanism used to allow one or more selected lengths of cord to be unwound and withdrawn from the reel and remain withdrawn without constant tension on the withdrawn portion of cord. When disabled, the latch mechanism also allows the cord to automatically retract and rewind onto the reel. The latch mechanism is utilized in conjunction with a direction sensor that senses whether the cord is being withdrawn or retracted. A lever is provided that will interrupt the operation of the direction sensor at any desired point or points. A cam wheel can be adapted to trigger the preventing function at the desired point or points.

The cord reel assembly includes a reel defined by a first generally circular plate spaced from a second generally circular plate by a hub or axle that is rotatable to wind and unwind a length of cord material attached at one end thereof to the hub, e.g., a communications cable suitable for a telephone handset, game controller, and the like, for example a USB cable (e.g., USB 2.0). The reel is biased by a spiral spring adapted so that cord that is withdrawn and unwound from the reel will automatically rewind when the latch mechanism is disabled. A pilot mechanism is operably engageable with the latch mechanism. The pilot mechanism is movable between a first and a second position, wherein in the first position the pilot mechanism prohibits the functioning of the latch mechanism, and wherein in the second position the latch mechanism is operable. The reel and attached hubs are biased by a spring (e.g., a spiral spring) to provide for automatic retraction of the cord in certain configurations.

The predetermined length of the cord material is wound about the hub of the reel in overlapping helical layers such as in a spool of fishing line, thread, or wire. One end of the cord material is attached to the hub of the reel. A spirally coiled FFC cable of approximately the same length as the intended maximum length of cord to be extended from the reel is mounted onto a collar projecting from the first circular plate of the reel on the same axis of rotation as the reel. The FFC is housed within a cylindrical chamber or housing of approximately the same diameter as the reel. One end of the FFC is attached to the collar and is operably connected to the end of the cord attached to the hub, such that the cord and FFC together comprise a single data and power transmission pathway. The turns of the spiral are configured such that the unshielded side of the cable comes into contact with the shielded side of the cable, thus providing a complete shielding effect to the data and power transmission wires of the FFC when wound on the hub. The other end of the FFC is connected to a circuit board mounted in or on the housing, which in turn is in operable connection with another cord or wire adapted to connect with an apparatus such as a computer, an entertainment device, and the like. The chamber or housing for the FFC has a larger cylindrical height than the width of the FFC cable (preferably less than about 10% larger to prevent twisting of the FFC). The reel hub and the collar to which the FFC is attached rotate together in the same direction and at the same rotational speed.

In some embodiments, the FFC is wound around the collar in a one dimensional spiral configuration in a direction opposite of the direction in which the cord material is wound on the reel. Since one end of the FFC is attached to the collar/reel, and the other end is stationary (by virtue of being attached to the circuit board in the housing), when the reel rotates, the number of turns of the spiral winding increases or decreases, depending on the direction in which the reel is rotating. The winding of the FFC is configured so that when the maximum length of cord is withdrawn from the cord reel (i.e., when the smallest number of turns of cord remain around the cord reel hub), the FFC is in its tightest spirally wound configuration (i.e., the greatest number of turns of the spiral around the collar). Conversely, when the cord is retracted back onto the reel the number of turns of the FFC around the collar decreases. When the maximum intended number of turns of cord material are wound around the reel hub, the FFC is in its loosest spiral configuration (i.e., the least number of turns of the spiral around the collar).

In other embodiments, the FFC is wound in a one dimensional spiral configuration in the same direction in which the cord material is wound on the reel. Since one end of the FFC is attached to the collar/reel and the other end is stationary, when the reel rotates, the number of turns of the spiral winding of the FFC increases or decreases, depending on the direction in which the reel is rotating. In this embodiment, the winding of FFC is configured so that when the maximum length of cord is withdrawn from the cord reel (i.e., when the smallest number of turns of cord remain around the cord reel hub), the FFC is in its loosest spirally wound configuration (i.e., the least number of turns of the spiral around the collar). Conversely, when the cord is retracted back onto the reel the number of turns of the FFC around the cable hub increases. When the maximum intended number of turns of cord material are wound around the reel hub, the FFC is in its tightest spiral configuration (i.e., the largest number of turns of the spiral around the collar).

The end of the cord material attached to the reel hub is operably connected to the end of the FFC connected to the flat cable hub via a circuit board or wiring such that the power transmission wires of the FFC are operably connected to power transmission wires in the cord material, and the data transmission wires in the FFC are operably connected to data transmission wires in the cord material. Consequently, the cord material and the FFC together effectively constitute a single continuous electrical cable (e.g., a USB 2.0 cable).

In other embodiments, a plurality of points along the range of cord extension between being fully wound onto the reel and being fully extended from the reel can be provided whereat the latch pilot mechanism switches between the engaged and disengaged conditions, respectively preventing the latch mechanism and allowing the latch mechanism to operate.

In another aspect of the invention, a storage assembly having a reel for storing a length of material includes a direction sensor and a lever. The direction sensor is operably arranged with the reel. The direction sensor can latch the reel such that the reel is prevented from moving in a retraction direction for winding the material onto the reel. The lever is operably engageable with the direction sensor. The lever is movable between an engaged position and a disengaged position. When the lever is in the engaged position, the lever prevents the direction sensor from operating to latch the reel. When the lever is in the disengaged position, the direction sensor is free to operate to latch the reel. The lever can be automatically placed in the engaged position over a desired range of lengths of material extending from the reel.

A plate can support the latch mechanism and the latch pilot mechanism. The reel, the plate, the latch mechanism, and the latch pilot mechanism can be stored in a housing. The plate can be mounted to the housing. The reel is free to rotate in the housing to wind and unwind the cord.

In operation, the retractable cord reel features a two-stage system. When the cord is extended more than a predetermined length, such as eighteen inches, from the reel, for example, the cord may be locked in place. To release the cord from this locked position, a short pull is made on the cord. To return the handset device to its stored position in a cradle from a point where the cord is extended more than approximately eighteen inches, the cord is pulled and released. Thereafter, the cord is permitted to retract and to rewind onto the reel. While the latching cord reel of the prior art allowed for the cord to be latched at any position short of the fully-extracted position, the two-stage retractable cord reel of the present invention cannot be locked in place when the cord is extended less than the predetermined length, such as eighteen inches. In summary, so long as the cord is extended less than the predetermined length, e.g., eighteen inches, from the reel, the latch mechanism cannot be operated. The refraction mechanism mounted to the reel will fully retract the cord without leaving a "pigtail" of cord. This full retraction feature prohibits inadvertent locking of the cord with only an inch or two extended and avoids the problem of a pigtail of cord being pinched or wedged between the handset and the cradle.

In one method for selectively latching a length of material wound onto a reel, a latch mechanism and a pilot mechanism are provided. The pilot mechanism is engaged with the latch mechanism to prevent the operation of the latch mechanism over a predetermined range of travel of the length of material from the reel. The material is extended to a length greater than the predetermined length to disengage the pilot mechanism from the latch mechanism and to allow the latch mechanism to latch the cord.

The following non-limiting embodiments are described below to illustrate certain aspects of the FFC and apparatus described herein.

Embodiment 1 is a flat flexible cable (FFC) comprising: a ribbon of generally parallel wires embedded in a non-conductive polymeric matrix, the FFC having two ends, an end to end length, a width perpendicular to the length in a plane defined by the wires, and a thickness in a direction perpendicular to the length and width; the embedded wires comprising two or more power transmission wires and two or more data transmission wires; each data wire in the FFC being spaced from any adjacent wire by a portion of the polymeric matrix; the FFC comprises non-shielded end regions flanking a shielded middle region that includes a shielding layer on at least one side thereof; and a non-conductive coating over the shielding layer; wherein the shielding layer comprises a metal-containing coating, foil, or film, and optionally is in electrical contact with at least one of the data transmission wires at one or more spaced locations along the length of the FFC; the polymeric matrix is absent in a portion of the non-shielded end regions; the power transmission wires have a larger cross-sectional area relative to the data transmission wires; and the power transmission wires are flattened in the plane defined by the wires such that they have a greater width than thickness.

Embodiment 2 comprises the FFC of embodiment 1 wherein the FFC comprises two to six power transmission wires and two to ten data transmission wires.

Embodiment 3 comprises the FFC of embodiment 2 wherein the data transmission wires and the power transmission wires are symmetrically disposed across the width of the FFC.

Embodiment 4 comprises the FFC of any one of embodiments 1 to 3 wherein the shielding layer is present on only one side of the FFC.

Embodiment 5 comprises the FFC of any one of embodiments 1 to 4 wherein the shielding layer comprises a metal-containing coating or paint.

Embodiment 6 comprises the FFC of any one of embodiments 1 to 5 wherein the shielding layer comprises a coating of silver paint.

Embodiment 7 comprises the FFC of any one of embodiments 1 to 6 wherein the polymeric matrix comprises two or more polymer sheets laminated together around the data transmission and power transmission wires.

Embodiment 8 comprises the FFC of any one of embodiments 1 to 7 wherein the polymeric matrix comprises a polyester.

Embodiment 9 comprises the FFC of any one of embodiments 1 to 8 wherein the shielding layer electrically contacts at least one of the data wires through one or more aperture that is partially cut through the polymeric matrix to the data transmission wire on the same side of the FFC as the shielding layer.

Embodiment 10 comprises a method of manufacturing the FFC of any one of embodiments 1 to 9, comprising the steps of: passing generally parallel wires between one or more rollers to establish a uniform thickness of the conductors; the wires initially comprising two or more power transmission precursor wires having a first diameter and two or more data transmission wires having a second diameter that is smaller than the first diameter; disposing these generally parallel wires between two or more polymeric sheets to form a pre-laminate structure; passing the pre-laminate-structure through opposed rollers that apply sufficient pressure to the pre-laminate structure to press the polymer sheets together to form an intermediate cable structure; optionally cutting apertures from one side of the intermediate cable structure in the vicinity of at least one of the data transmission wires to expose the wire on that one side; applying a shielding layer of a metal-containing coating to one side of the FFC, the shielding layer being applied on the side of the cable where the apertures have been cut when apertures are present; and applying a non-conducting coating (e.g., a polymer coating) over the shielding layer.

Embodiment 11 comprises a retractable cord reel comprising a spiral coil of the FFC of any one of embodiments 1 to 9 in operable connected to a spool of round data and power transmission cord, such that the power transmission wires in the FFC are operably connected to power transmission wires in the cord and the data transmission wires of the FFC are operably connected to data transmission wires in the cord, such that the cord and FFC together form a single power and data transmission pathway.

Embodiment 12 comprises a cord reel assembly comprising the cord reel of embodiment 11 wherein: the cord reel is defined by a first generally circular plate spaced from a second circular plate by a hub; the first and second plates having substantially the same diameter and being substantially parallel to each other, with a collar projecting from the first circular plate away from the hub and along the axis of rotation thereof, such that the collar rotates with the reel; the cord reel is rotatably mounted in a housing such that the reel is rotatable about an axis centered on and running through the hub; a length of cord material is wound around the hub, one end of the cord material being attached to the hub; one end of the FFC is attached to the collar, with the FFC spirally wound around the collar and the other end of the FFC is attached to a circuit board mounted on or in the housing, such that when the reel rotates, the number of spiral turns of the FFC increases or decreases depending on the direction of rotation; the reel being biased by a spring such that when a tension is applied to the end of the cord material that is not connected to the hub, the reel rotates against the bias of the spring as the cord is unwound, and when the tension is released, cord material is re-wound onto the reel due to the bias of the spring; a latch mechanism mounted to the housing, which is operably connected to the reel, the latch mechanism being is selectively operable to latch the reel in a stationary position to prevent rewinding of the cord material; and a pilot mechanism mounted to the housing, which is operably engageable with the latch mechanism to prevent the latch mechanism from operating.

Embodiment 13 comprises the cord reel assembly of embodiment 12 wherein: the cord reel includes an internal gear portion on the second plate; the latch mechanism comprises a direction sensor operably arranged with a gear wheel, the direction sensor and the gear wheel being operably arranged such that the direction sensor is engageable with the internal gear portion of the reel to achieve latching of the reel; and the pilot mechanism is moveable between a first and second position, wherein in the first position the pilot mechanism prohibits the functioning of the latch mechanism, and in the second position the latch mechanism is operable.

Embodiment 14 comprises the cord reel assembly of embodiment 13, which further includes a gear catch, the gear catch being operably arranged with the gear wheel to permit the gear wheel to incrementally move between a first position and a second position; wherein when the gear wheel is in the first position, the direction sensor can engage the internal gear portion of the reel to activate the latch mechanism, and when the gear wheel is in the second position, the reel is free to rotate with respect to the latch mechanism in a retraction direction for winding the cord material back onto the reel.

Embodiment 15 comprises the cord reel assembly of any one of embodiments 12 through 14 wherein the FFC adopts an ovoid spiral configuration when the FFC is loosely wound around the collar.

Embodiment 16 comprises the cord reel assembly of any one of embodiments 12 through 15 in which a curved partition is included within the housing for the FFC to deflect the FFC into an ovoid spiral configuration when the FFC is loosely wound around the collar.

The FFC described herein provides a number of advantages over conventional FFC. For example, the preferred USB 2.0 embodiment describe above provides integration of power and data into an FFC with minimized ohmic losses by utilizing multiple power feeds and returns, either round or flat, that match the thickness of the non-power carrying (signal/data) conductors. In addition, integration of power and data into an FFC with minimized ohmic losses in the power feeds and returns is achieved by utilizing heavy gage conductors rolled flat to match the thickness of the non-power carrying (signal/data) conductors. The use of signal carrying conductors with a single sided shield and adjacent guard signals in a specific geometric configuration can provide USB 1.0 and USB 2.0 controlled impedance requirement of 90 Ohms+/−15%. A specific thickness of insulating material (dielectric) on the unshielded side of the FFC is provided, such that when a shield, ground plane, or metallic chassis is introduced to the unshielded side of the FFC, the impedance of the signal carrying conductors exhibits the USB 1.1 and USB 2.0 controlled impedance requirement of 90 Ohms+/−15%. Signal carrying conductors with a single sided shield and adjacent guard signals in a specific geometric configuration exhibit the USB 2.0 common mode impedance requirement of 30 Ohms+/−30%. The specific thickness of insulating material (dielectric) described in the preferred USB 2.0 embodiment operates such that when a shield, ground plane, or metallic chassis is introduced to the unshielded side of the cable, the impedance exhibits the USB 2.0 common mode impedance requirement of 30 Ohms+/−30%. The use of a single sided shield increases manufacturability, reliability, and minimizes the overall thickness of the cable. This cable can also facilitate the addition and integration of any number of analog, sensor, control, data, high-speed data, and/or other signal types.

In the following description, reference is sometimes made to the "top," "bottom," or other regions of the cord reel and its various components. It should be understood that these terms are used solely for convenient reference, inasmuch as the cord reel may be used omnidirectionally.

DESCRIPTION OF THE DRAWINGS

FIG. 6 is a side elevational view of the cord reel assembly of the invention.

FIG. 7a is a top plan view of the cord reel assembly of the invention with a top portion of a cam wheel of the latch pilot mechanism removed for illustrative purposes.

FIG. 10a is a top plan view of the cord reel assembly of the invention with the top portion of the gear wheel removed for illustrative purposes.

FIG. 11 is a top plan view of the cord reel assembly of the invention illustrating the direction sensor in an extracted position.

DETAILED DESCRIPTION OF THE EXEMPLIFIED EMBODIMENTS

Figure 1:
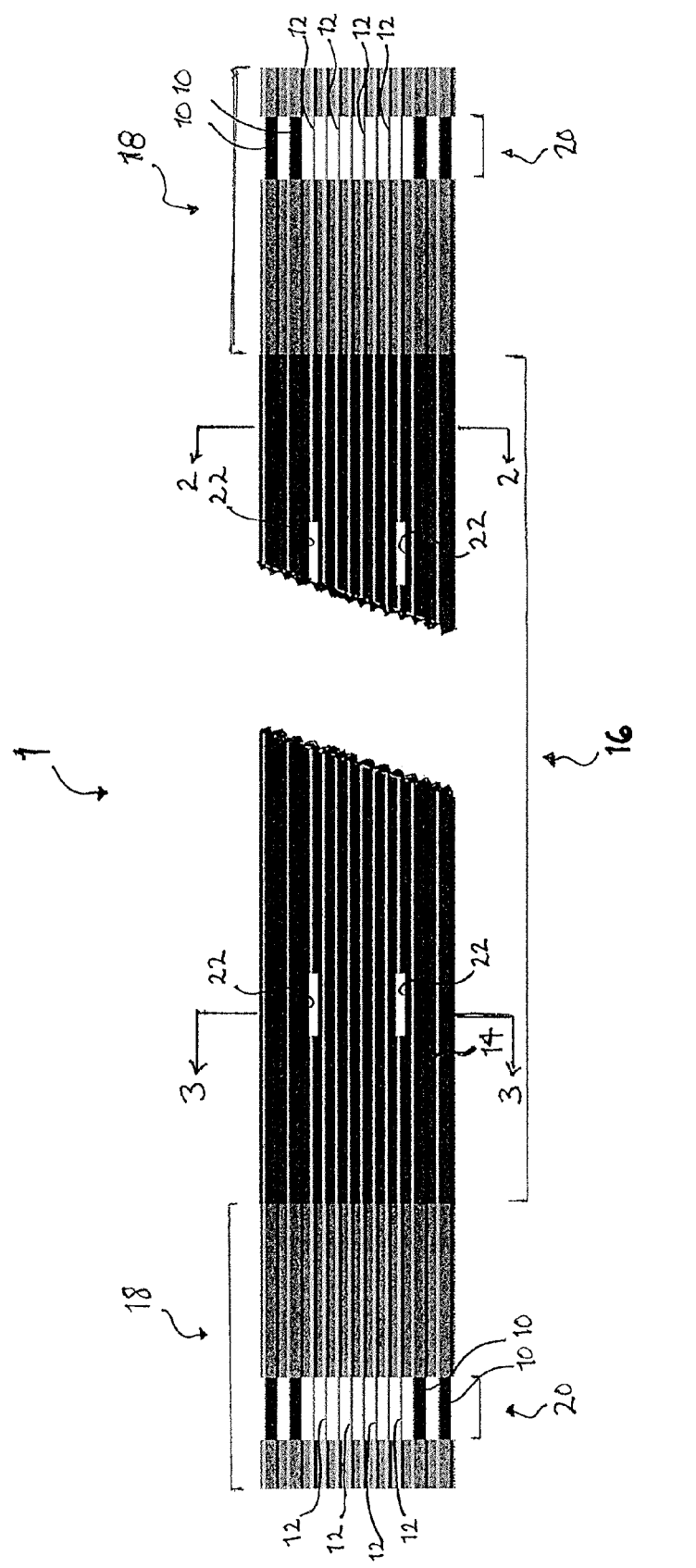
FIG. 1 is a top plan view of an illustrative flat flexible cable (FFC) as described herein.

The exemplified embodiments of the present invention illustrate a new flat flexible cable that comprises single strand wires of at least two different gauges embedded in a flexible, non-conductive polymeric matrix. At least a portion of the FFC is shielded by a metal-containing layer (e.g., a metallic paint such as a silver paint), preferably on only one side of the FFC. The wires of the largest gauge are flattened in the plane of the cable relative to the smaller gauge wires, such that the flattened wires have a width that is greater than the height of the wires. In some embodiments, the height of the flattened wires are approximately equal to the height of the smaller gauge wires. The FFCs described herein have features and/or properties of both flexible circuit-type cables and ribbon cables. The FFC described herein is suitable for use in a number of high speed data transfer and power conduction applications, such as USB 2.0 applications, while maintaining a relatively narrow cable width and thin profile, which makes these cables suitable, e.g., for use in selectively retractable cord reel assemblies for communication handsets and gaming controllers, such as those present, for example, in many airline seat backs.

A cord reel assembly incorporating the new FFC described herein comprises a reel to store a cord (such as a conventional USB 2.0 cord), a retraction mechanism to wind the cord onto the reel, a latch mechanism to latch the cord in an extended position, and a latch pilot mechanism configured to enable and to disengage the latch mechanism at one or more desired points of cord extension. In the operation of one embodiment, a user pulls on a free end of a cord to unwind the cord from the reel. The latch pilot mechanism acts to prevent the latch mechanism so that the latch mechanism cannot latch the cord when the cord is in a range of positions between being fully wound onto the reel and being extended a predetermined length. Once the cord is extended beyond the predetermined length, the latch pilot mechanism allows the latch mechanism to operate normally. The latch mechanism continues to operate normally until the cord is retracted to less than the predetermined length, whereupon the latch pilot mechanism again prevents the latch mechanism from operating.

While the invention is susceptible of various modifications and alternative constructions, certain illustrated embodiments thereof have been shown in the drawings and will be described below in detail. It should be understood, however, that there is no intention to limit the invention to the specific forms disclosed, but on the contrary, the intention is to cover all modifications, alternative constructions, and equivalents falling within the spirit and scope of the invention.

Referring now to the drawings, FIG. 1 provides a top plan view of exemplary FFC 1, which comprises power transmission wires 10 flanking data transmission wires 12 embedded within non-conductive polymeric matrix 14. FFC 1 includes a shielded middle section 16 capped by two non-shielded end sections 18. Each end section 18 includes a region 20 where wires 10 and 12 are bare, to facilitate soldering to a circuit board. Middle section 16 includes zones 22 in which a shielding layer makes electrical conduct with a data transmission wire 12.

Figure 2:
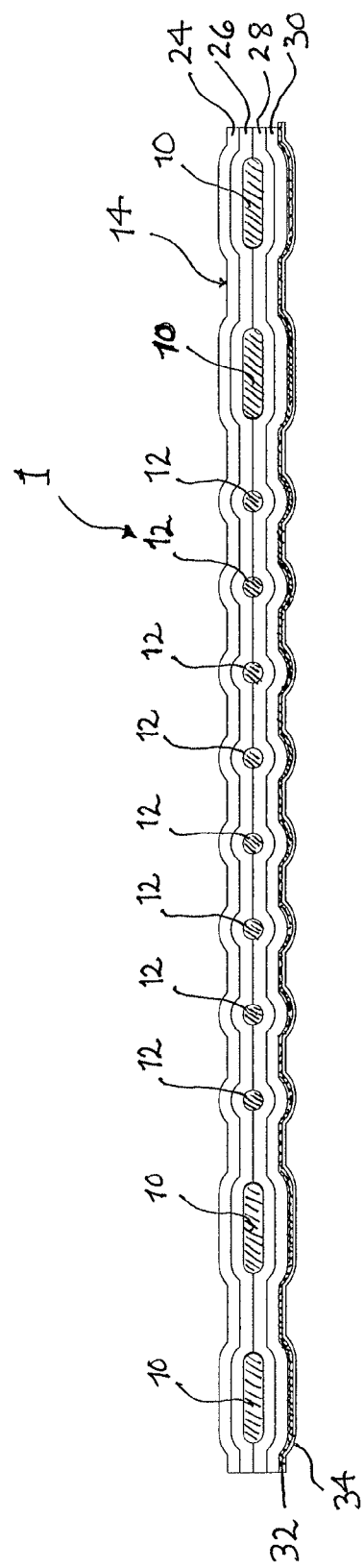
FIG. 2 is a cross-sectional view of the FFC of FIG. 1 along line 2-2.
Figure 2A:
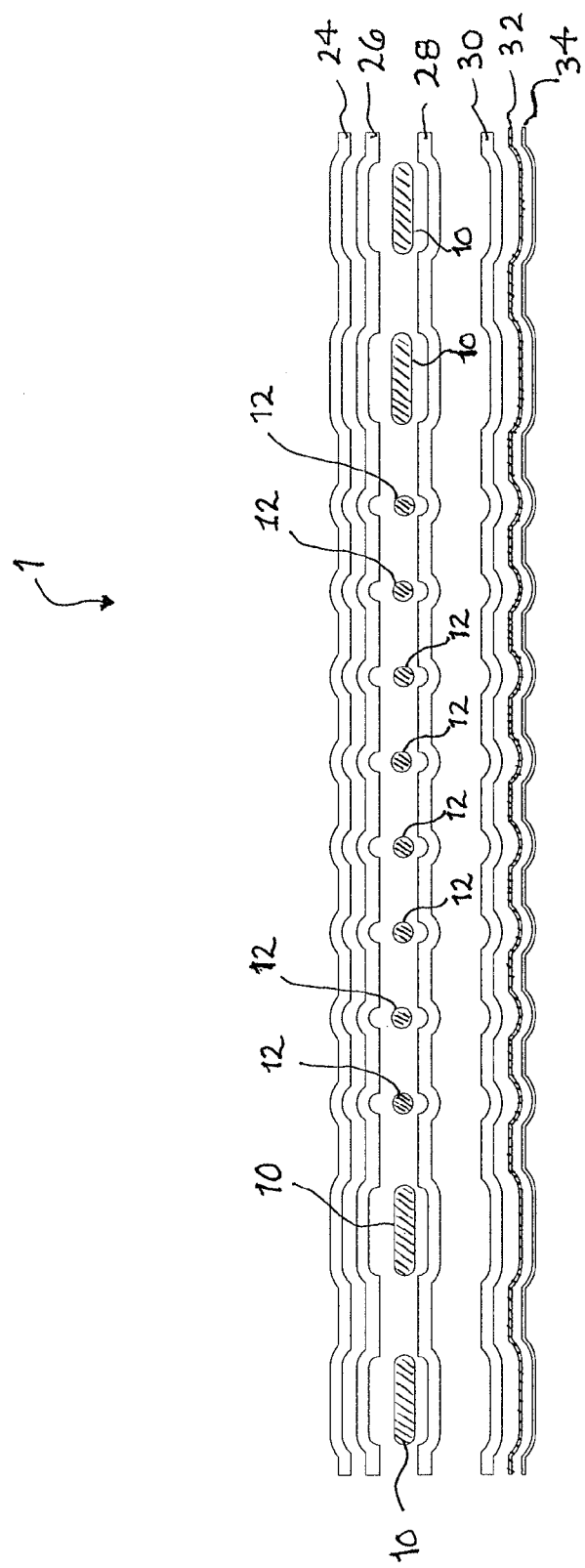
FIG. 2a is an exploded view of the cross-section shown in FIG. 2.

FIG. 2 is a cross-sectional view FFC 1 along line 2-2 of FIG. 1, and illustrates an embodiment in which polymeric matrix 14 comprises polymer sheets 24, 26, 28, 30 laminated together in that order from top to bottom, with wires 10 and 12 between sheets 26 and 28, such that one surface of polymeric matrix 14 comprises sheet 24 and an opposed surface of polymeric matrix 14 comprises sheet 30. Shielding layer 32 is deposited on layer 30 as a thin film or coating. Typically shielding layer 32 comprises a metallic paint or a metallic foil (e.g., a paint or foil comprising silver, copper, or aluminum). Protective conformal layer 34 is provided over shielding layer 32 and comprises a non-conductive coating (e.g., a polymer coating). FIG. 2a provides an exploded view of the cross-section of FIG. 2 to better illustrate the order of the various layers and sheets.

Figure 3:
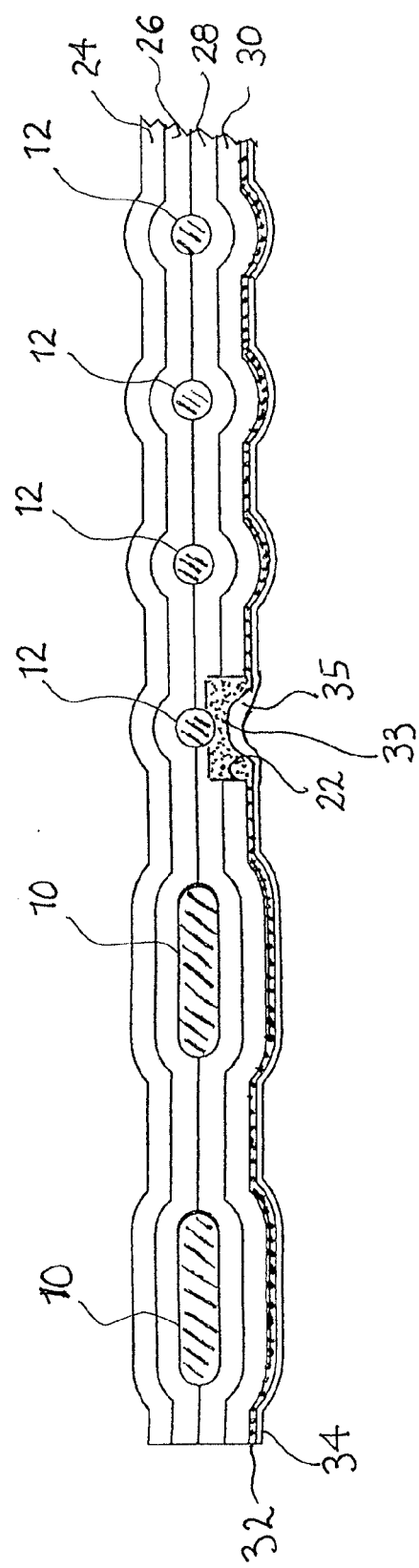
FIG. 3 is a fragmentary cross-sectional view of the FFC of FIG. 1 along line 3-3.

FIG. 3 is a fragmentary cross-sectional view of FFC 1 along line 3-3 of FIG. 1. FIG. 3 illustrates zone 22, which is defined by a cut-out from layers 30 and 28 in the vicinity of a data wire 12. Shielding layer 32 extends into zone 22 to electrically contact wire 12 as a slightly thicker region 33 of shielding layer 32. Region 33 is covered by portion 35 of conformal layer 34.

Figure 4:
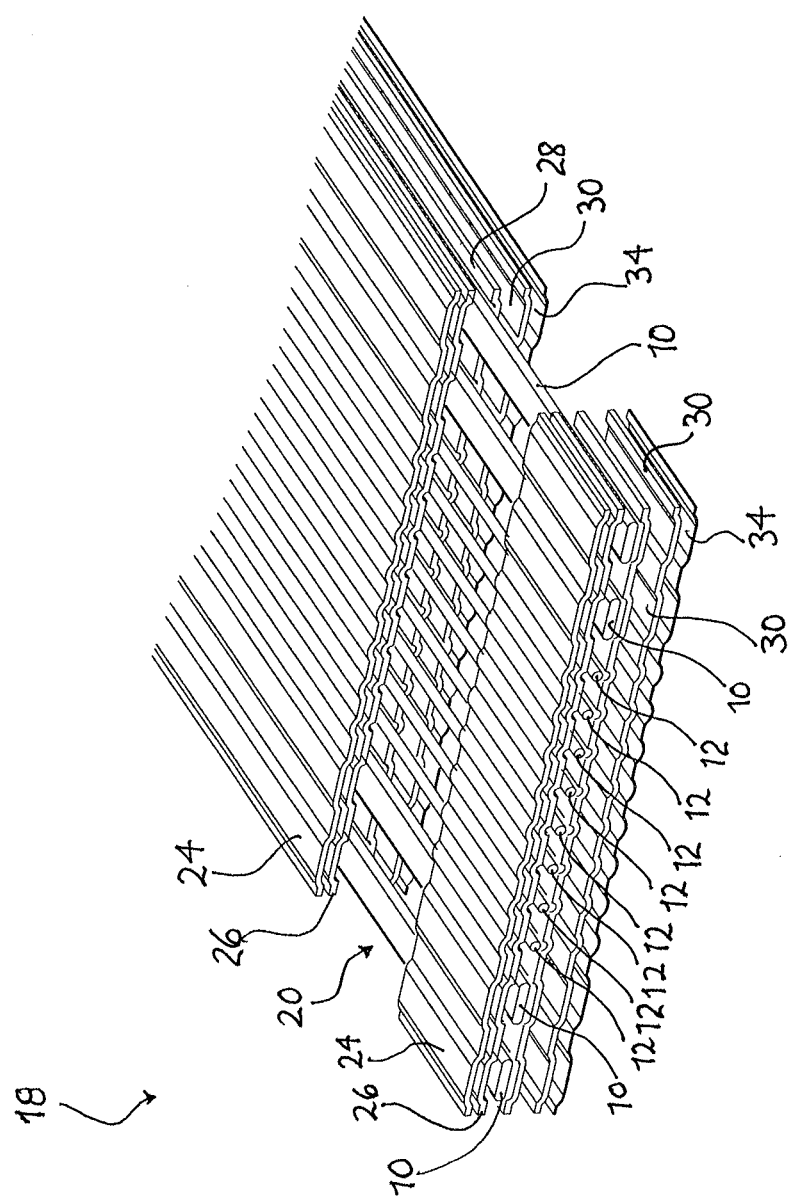
FIG. 4 is an exploded perspective view of end section 18 of the FFC of FIG. 1.

FIG. 4 is an exploded perspective view of end section 18 of FFC 1. As shown in FIG. 4, shielding layer 32 is absent in end section 18 such that protective layer 32 directly contacts sheet 30 of polymeric matrix 14.

In some embodiments, FFC 1 has a width in the range of about 0.2 to 0.5 inches (e.g., about 0.4 inches), a thickness of about 0.015 inches to 0.03 inches (e.g., about 0.02 inches), and a length of about 36 to 60 inches. Lamination of the FFC components can be achieved with or without the use of adhesives between the sheets, depending on the types of polymer forming the sheets. Adhesives for lamination of the polymeric sheets include any adhesive suitable for use in conjunction with electrical and electronic components, suitable example of which include e.g., epoxy adhesives, acrylic adhesives, and the like. Thermoplastic polymer sheets can be laminated without adhesive, in some cases, by application of heat and pressure.

In some embodiments, shielding layer 32 comprises a metallic paint. The paint can comprise any metal, but commonly will comprise, silver, copper, or aluminum. The thickness of the shielding layer generally will be in the range of about 0.0005 inches to about 0.002 inches.

The conformal layer 34 is a protective film or coating that is formed from a non-conductive material. In some embodiments, the conformal layer 34 comprises a polymer coating, or varnish. The thickness of the conformal layer generally will be in the range of about 0.0005 inches to about 0.002 inches.

Polymeric matrix 14 and sheets 24, 26, 28, 30 thereof can be composed of any flexible, non-conductive polymeric material, such as a polyester material (e.g., polyethylene naphthalenate, polyethylene terephthalate), a parylene polymer, a vinyl polymer (e.g., polyvinylchloride), a polyimide, a polycarbonate, a silicone polymer, a fluoropolymer (e.g., polytetrafluoroethylene), and the like. Individual polymer sheets utilized to form the polymer matrix around the wires can be of any desired thickness. In some embodiments, the sheets 24, 26, 28, 30 have thicknesses in the range of about 0.003 to 0.004 inches (e.g., about 0.0035 inches)

The data transmission wires can have any desired gauge or diameter. Similarly, the power transmission wires can have any desired cross-sectional area, thickness and width. In some embodiments, data transmission wires 12 have a diameter of about 0.005 to 0.007 inches (e.g., about 0.006 inches) and power transmission wires 10 have a width of about 0.015 to 0.04 inches (e.g., about 0.03 inches), and thickness (height) about equal to the diameter of data transmission wires 12.

The number of the data transmission wires 12 and power transmission wires 10 can be configured at any desirable number. In the embodiment shown in FIGS. 1 to 4, there are eight data transmission wires 12 flanked on either side by pairs of power transmission wires 10. In other embodiments, the arrangement and number of the wires can be varied depending on the intended purpose or use of the FFC. An arrangement of the data and power transmission wires that is symmetric across the width of the cable (e.g., as shown in FIG. 1) is desirable in some embodiments to minimize the tendency of the wire to twist when being spirally wound on a hub. The embodiment of FIG. 1 includes two power transmission wires 10 flanking eight data transmission wires 12; however, another embodiment can include just one power transmission wire along each edge and/or six or ten data transmission wires, for example. In each pair of power transmission wires 10 shown in FIG. 1, the wires 10 are spaced from each other. Alternatively, two or more power transmission wires can be in electrical contact, if desired. The data transmission wires 12 and power transmission wires 10 can have any desired pitch (spacing) or can be groups with two or more different pitches. In some embodiments, the data transmission wires 12 typically will have a uniform pitch in the range of about 0.02 to about 0.03 inches (e.g., about 0.025 inches). In some embodiments, power transmission wires 10 typically have a pitch of about 0.04 to 0.06 inches, and spacing between a power transmission wire 10 and an adjacent data transmission wire 12 typically will be about 0.03 to 0.04 inches.

The FFC described herein are wire-type FFC, as opposed to printed circuit-type FFC. The FFC can conveniently be manufactured by a lamination process, in which spaced power and data transmission wires are laminated between two or more sheets of polymer material (e.g., a thermoplastic polymer, a polyester, and the like). The power transmission wires can be provided in an already flattened configuration relative to the data transmission wires (which generally will be round wires, i.e., having a circular cross-section). In one convenient manufacturing process, the power transmission wires 10 start out as round wires of greater diameter than the diameter of data transmission wires 12, which are rolled to a thickness equivalent to the data transmission wires. Then the sandwiched laminate of sheets and wires is conveyed through one or more rollers under pressure sufficient to bond the materials into a single FFC. The pressure also aids in forming a strong adherence between the layers of the polymeric matrix in the laminate. Zones 22 are formed, e.g., by laser cutting a portion of polymeric matrix 14 to expose a wire 12 at selected points along the length of the cable. Zones 22 can be incorporated in the vicinity of several or all of data wires 12 at one or more points along the wires. Shielding layer 32 can be applied to matrix layer 30, e.g., by spraying a metal-containing paint (e.g., a silver containing paint) over layer 30. Exposed wires 12 contact the shielding metallic paint in zones 22, where some of the paint fills a portion of each zone as a contact region 33. Protective layer 34 comprises a non-conductive coating that is sprayed or otherwise applied over shielding layer 32. A portion 35 of the conformal layer coating 34 covers contact region 33 of shielding layer 32.

Figure 5:
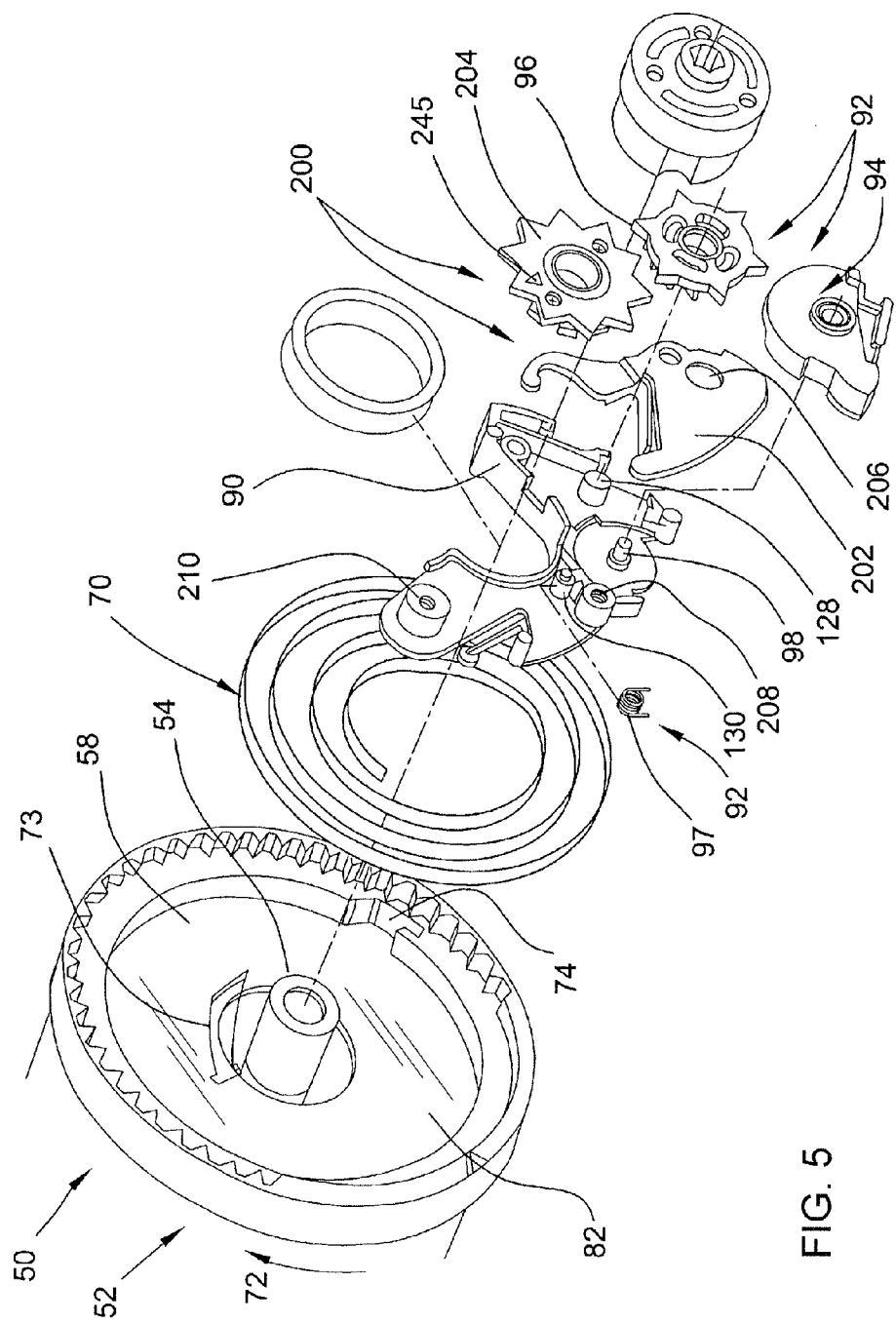
FIG. 5 is an exploded view of a cord reel assembly.
Figure 7:
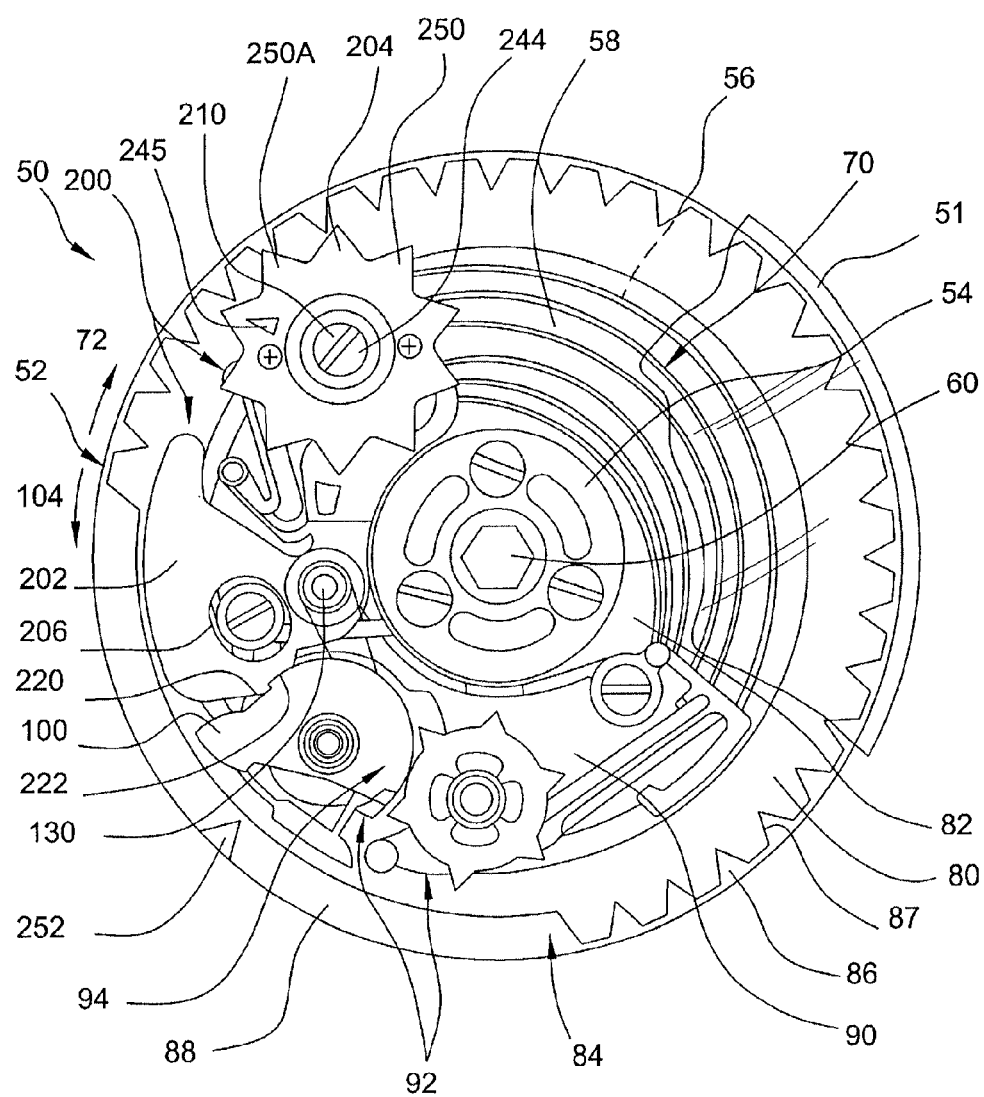
FIG. 7 is a top plan view of the cord reel assembly of the invention illustrating the latch pilot mechanism in an engaged position preventing the latch mechanism from operating.

An illustrative selectively retractable cord reel assembly 50 disposed in a housing 51 is shown in FIG. 7. Referring to FIGS. 5, 6, and 7, the reel assembly 50 includes a reel 52 having a hub 54, a first wall 56, and a second wall 58. The first and the second walls 56, 58 depend from the hub 54 and are in lateral, spaced relation to each other. The reel 52 includes a central mounting hole 60 located in the hub 54 for rotationally mounting the reel 52 such that the reel assembly 50 is free to rotate about a transverse axis 62, as shown in FIG. 6.

The second wall 58 includes a projecting flange portion 80 that defines a compartment 82. The flange portion 80 is generally circular and includes a rim 84 having an internal gear portion 86 with a plurality of teeth 87 projecting inward and a wall portion 88, referred to as a "dead zone." The internal gear portion 86 and the dead zone portion 88 will be discussed in greater detail herein.

Referring to FIG. 6, the reel 52 can be used for storing a length of material such as string or wire cord, for example. An illustrative wire cord 64 is wound onto the reel 52 and stored in a recess 66 defined by the first and the second walls 56, 58. The cord 64 can be of any suitable construction that is sufficiently flexible to be wound in a diameter generally conforming to the diameter of the hub 54. The cord 64 can be any known type, such as, communication, telephone, USB, data, electrical, or other type. The illustrative cord 64 is approximately forty inches long. The cord 64 can be unwound from the reel. The reel 52 is configured such that it must undergo approximately nine and one-half turns to fully take up or to unwind the cord 64.

One end of the cord 64 is secured to the reel 52 by any suitable method and the other end of the cord can extend out from the housing and has a connector 67 for connection to an implement, such as a telephone handset, game controller, or In Flight Entertainment (IFE) handset controller. The housing 51 can be constructed such that it includes an aperture 68 through which the cord can extend. A stop 69 is mounted to the cord 64 adjacent the free end of the cord. To prevent the free end of the cord from entering the housing 51, the stop 69 is configured such that it cannot pass through the aperture 68. The stop 69 can be made from a flexible material, such as rubber, or from any other suitable material. The cord 64 is fully wound onto the reel 52 when the stop 59 is engaged with the housing 51 as seen in FIG. 6.

In another embodiment, the aperture 68 can be configured such that the connector 67 cannot pass through the aperture 68. With that construction for the aperture, the cord is fully wound onto the reel 52 when the connector 67 is closely adjacent the housing 51.

Figure 5A:
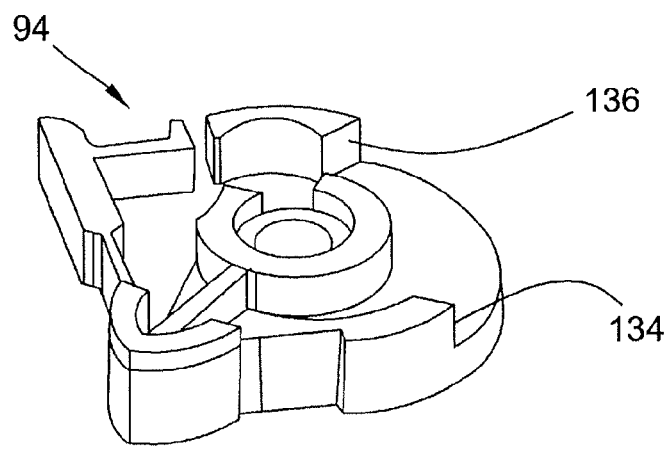
FIG. 5a is a bottom plan view of the direction sensor.

As best seen in FIG. 5, the reel assembly 50 includes a retraction mechanism 70 in the form of a spring mounted to the reel 52 for rotationally biasing the reel to rotate in a retraction direction 72. The spring 70 is connected to the reel 52. At one end the spring 70 is inserted in a slot 73 in the second wall 58 of the reel and at the other end the spring 70 is inserted into a groove 74 in the second wall 58. When the cord is fully wound onto the reel 52, the spring 70 is disposed in a normal position with the spring arranged in loose generally concentric rings around the hub 54. As the cord is extracted, the reel 52 rotates causing the spring 70 to rotate in turn. The spring 70 tightens inward upon itself, consequently developing a return force that tends to act toward returning the spring 70 to its normal position. When the cord is released, the return force of the spring 70 acts to retract the cord onto the reel 52. Although the retraction mechanism is illustrated as a spring, any suitable retraction mechanism can be used in the cord reel assembly 50 of the present invention The reel assembly 50 also includes a mounting plate 90 disposed within the compartment 82. The mounting plate 90 is mounted to the housing such that the reel 52 can rotate relative to the mounting plate 90. A latch mechanism 92 for selectively latching the cord in a desired extended position is mounted to the mounting plate 90. The exemplary latch mechanism 92 includes a direction sensor 94 operably arranged with a gear wheel 96 and a spring 97. The direction sensor 94 is rotationally mounted to a first post 98 projecting from the mounting plate 90 such that the direction sensor 94 can rotate about the first post 98. The gear wheel 96 of the latch mechanism 92 is rotationally mounted to a second post 128 projecting from the mounting plate 90 such that the gear wheel 96 can rotate about the second post 128. The spring 97 is mounted to a third post 130 projecting from the mounting plate 90. The spring 97 includes two free ends extending from the third post 130 between the mounting plate 90 and the direction sensor 94. The ends of the spring can be placed in contact with respective stops 134, 136 of the direction sensor 94, shown in FIG. 5a.

Figure 5B:
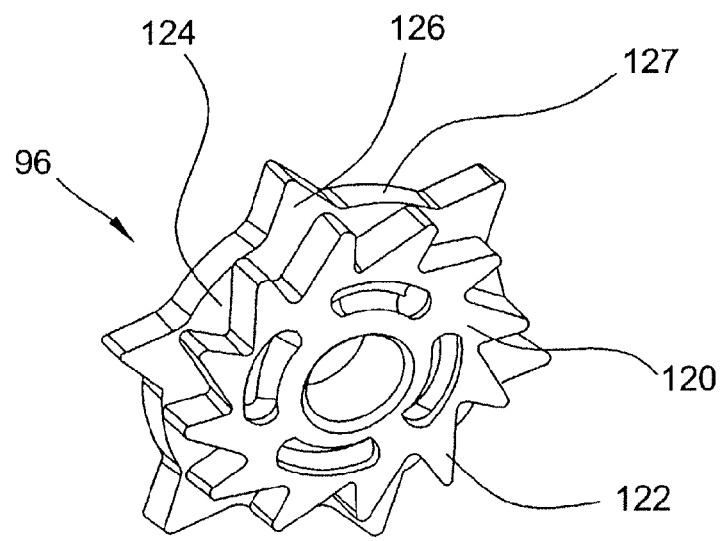
FIG. 5b is a bottom perspective view of the gear wheel.
Figure 5C:
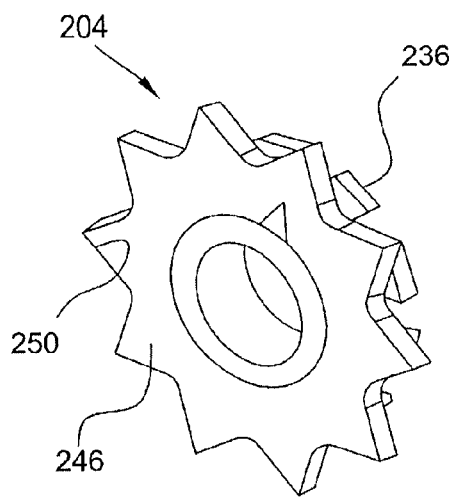
FIG. 5c is a perspective view of the cam wheel.
Figure 5D:
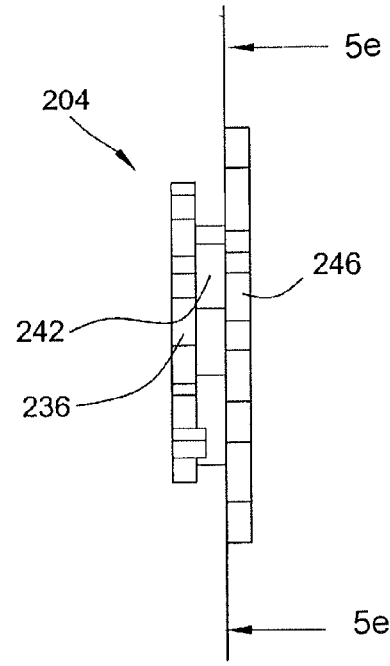
FIG. 5d is a side elevational view of the cam wheel depicted in FIG. 5c.
Figure 5E:
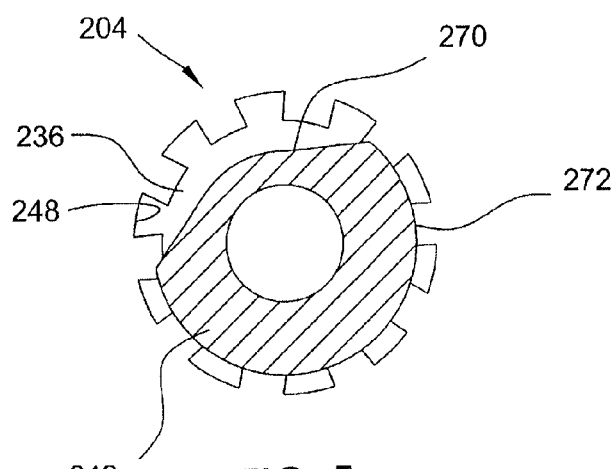
FIG. 5e is a cross-sectional view of the cam wheel taken along line 5e-5e in FIG. 5d.

Referring to FIGS. 5 and 5b, the gear wheel 96 of the latch mechanism 92 includes a bottom gear portion 120 preferably having twelve bottom teeth 122 and a top gear portion 124 preferably having six top teeth 126. The top teeth 126 are disposed in substantially uniform spaced relation to each other around the wheel, as are the bottom teeth 122. The bottom teeth 122 are arranged such that the base of one bottom tooth 122 is aligned with the base of each top tooth 126 and such that the base of one bottom tooth 122 is disposed substantially in the center of a gap 127 between each pair of adjacent top teeth 126. The bottom teeth 122 preferably are shaped in triangles that include one side having an acute angle and another side having an obtuse angle with respect to the base. The top teeth 126 preferably are shaped in generally isosceles triangles. When twelve bottom teeth and six top teeth are used, the arc defined by each pair of adjacent bottom teeth 122 is approximately 30.degree., and the arc defined by each pair of adjacent top teeth 126 is approximately 60 degrees.

As best seen in FIG. 5, in accordance with the teaching of the present invention, a latch pilot mechanism 200 is mounted to the mounting plate 90. The latch pilot mechanism 200 is provided to engage and disengage the latch mechanism 92 at one or more desired points of cord extraction. The latch mechanism 92 is operable to selectively latch the cord only when the latch pilot mechanism 200 is disengaged from the latch mechanism 92, thereby allowing the latch mechanism 92 to operate normally. In operation, the latch pilot mechanism 200 inhibits the operation of the latch mechanism 92, for example, while the cord is in a range from being fully retracted onto the reel 52 to being extracted about eighteen inches from the reel 52. When the cord is extracted beyond eighteen inches, for example, the latch pilot mechanism 200 is disengaged, and the latch mechanism 92 operates normally to latch the cord in a desired position.

The latch pilot mechanism 200 includes a lever 202 and a cam wheel 204. The lever 202 is rotationally mounted to the third post 130 such that the lever 202 can rotate about the third post 130. The lever 202 includes an elongated slot 206 to accommodate a mounting hole 208 in the mounting plate 90. The cam wheel 204 is rotationally mounted to a fourth post 210 projecting from the mounting plate 90 such that the cam wheel 204 can rotate about the fourth post 210. To facilitate assembly by indicating a specific attitude, the cam wheel 204 is preferably provided with a triangular-shaped recess 245 or other marking indicator.

Referring to FIGS. 5, 5c, 5d, and 5e, the cam wheel 204 has a bottom gear portion 236, a top gear portion 246, and a cam lobe 242. The cam lobe 242 includes a minor diameter 270 and a major diameter 272. The bottom gear portion 236 of the cam wheel 204 preferably has ten bottom teeth 248, and the top gear portion 246 likewise preferably includes ten top teeth 250. The bottom teeth 248, as well as the top teeth 250, are disposed in uniform spaced relation to each other. The arc defined by each pair of adjacent bottom teeth 248, and by each pair of adjacent top teeth 250, is approximately 36 degrees.

Referring to FIG. 6, a flat flexible cable 76 (e.g., an FFC such as shown in FIGS. 1 to 4) is connected at one end to a collar 77 projecting from the first wall 56 and is operably connected to one end of the cord 64, e.g., through a circuit board or other connection. FFC 76 is connected at the other end to a printed circuit board disposed within the housing, for example. The printed circuit board is in turn connected to a second cord 65. FFC 76 provides electrical continuity between the cord 64 and the printed circuit board and the second cord 65. In the illustrative cord reel assembly 50, the second cord 65 is connected at one end to the printed circuit board such that a free end of the second cord 65 extends a predetermined length from a second aperture 79 of the housing 51. A connector 78 for connection to an implement, such as a telephone base or IFE controller base, is provided at the free end of the second cord 65. Alternatively, the free end of the second cord 65 could be wired to telephone lines, for example, or another suitable power source.

When the cord 64 is fully wound onto the reel 52, FFC 76 is disposed in a normal position with the windings of the FFC arranged in loose generally concentric spiral arrangement around the collar 77. As the cord 64 is extracted from reel 52, collar 77 of the reel 52 rotates causing the end of FFC 76 connected to collar 77 to rotate, causing the spiral arrangement of FFC 76 to tighten inward upon itself When the cord 64 is retracted, FFC 76 returns to its normal position, looser spiral configuration.

Figure 13:
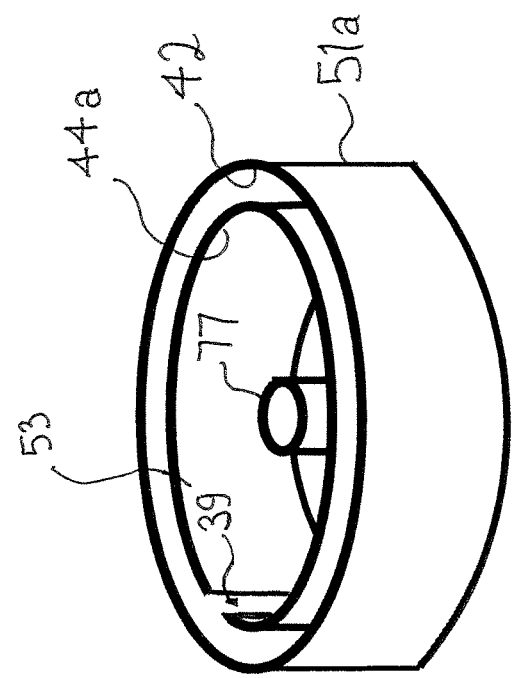
FIG. 13 is a schematic perspective view of a housing having a rotatable collar installed therein for mounting a spirally-wound FFC in a cord reel.
Figure 15:
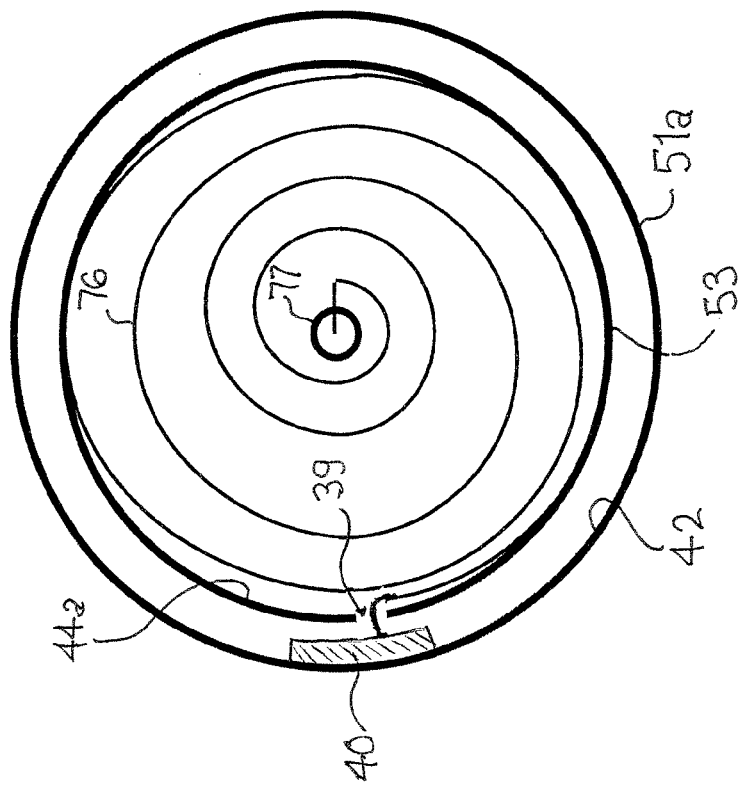
FIG. 15 is a top plan view of the housing shown in FIG. 13 with a spirally-wound FFC mounted therein.

FIG. 13 illustrates an embodiment of a generally cylindrical housing, which includes an outer housing wall 51a and an inner chamber wall 53. Inner chamber wall 53 defines cable chamber 44a, and rotatable collar 77, as described above with respect to FIG. 6, is centrally mounted within chamber 44a. Collar 77 is operably connected to the cord reel (e.g., as described above with respect to FIG. 6) and is rotatable with the cord reel. An FFC as described herein can be installed in a spirally wound configuration (as illustrated, e.g., in FIG. 15) around collar 77 with one end of the FFC attached to collar 77 and in electrical connection with the cord of the cord reel (e.g., cord 66 shown in FIG. 6) Inner chamber wall 53 also defines slot 39 for the other end of the FFC to pass through for mounting to a circuit board (as shown in FIG. 15). Inner chamber wall 53 is substantially cylindrical in shape and is spaced from outer housing wall 51a to define an annular space 42 for mounting the circuit board (e.g., circuit board 40 as shown in FIG. 15) therewithin.

FIG. 15 illustrates, in a top plan view, FFC 76 spirally wound around rotatable collar 77 with one end of FFC 76 connected to collar 77, and the other end of FFC 76 connected to circuit board 40 within annular space 42 after passing through slot 39. FFC 76 is illustrated edge-on in a loosely wound configuration around collar 77. Circuit board 40 provides a means for placing the cord reel in electrical connection with a telephone or other communication device, a gaming device, an IFE console, and the like, e.g., through a cord such as cord 65 shown in FIG. 6.

Figure 14:
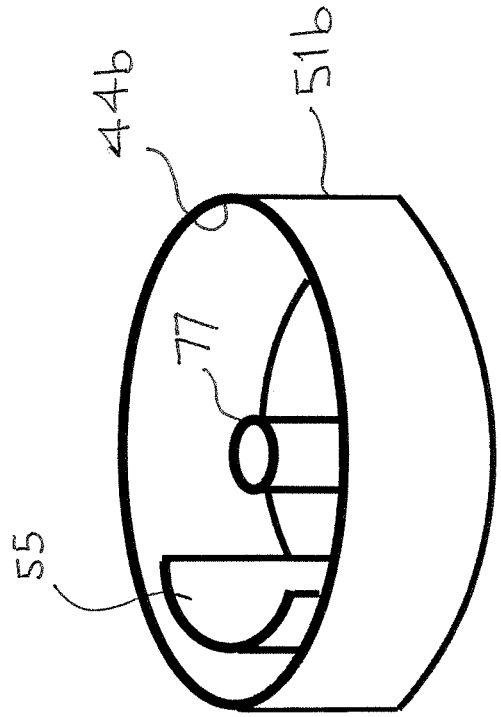
FIG. 14 is a schematic perspective view of an alternative housing having a rotatable collar installed therein for mounting a spirally-wound FFC in a cord reel.

FIG. 14 illustrates an alternative embodiment of a generally cylindrical housing, which includes an outer housing wall 51b and a curved inner partition 55 that is spaced from outer housing wall 51b in the interior of the housing, and extends across a portion of the interior of the housing defined by outer housing wall 51b. Partition 55 is curved, and preferably has a radius of curvature that is slightly larger than the radius of curvature of outer housing wall 51b. Partition 55 and outer housing wall 51b together define an FFC chamber 44b into which an FFC as described herein can be installed in a spirally wound configuration (as illustrated, e.g., in FIG. 16). Rotatable collar 77 is mounted in the center of the housing and is operably attached to the cord reel so as to rotate therewith so that one end of a spirally-wound FFC can be attached for electrical connection to the cord of the cord reel as described above with respect to FIG. 6. A circuit board for attachment to the other end of the FFC can be mounted between outer housing wall 51b and partition 55 (e.g., circuit board 40 shown in FIG. 16).

Figure 16:
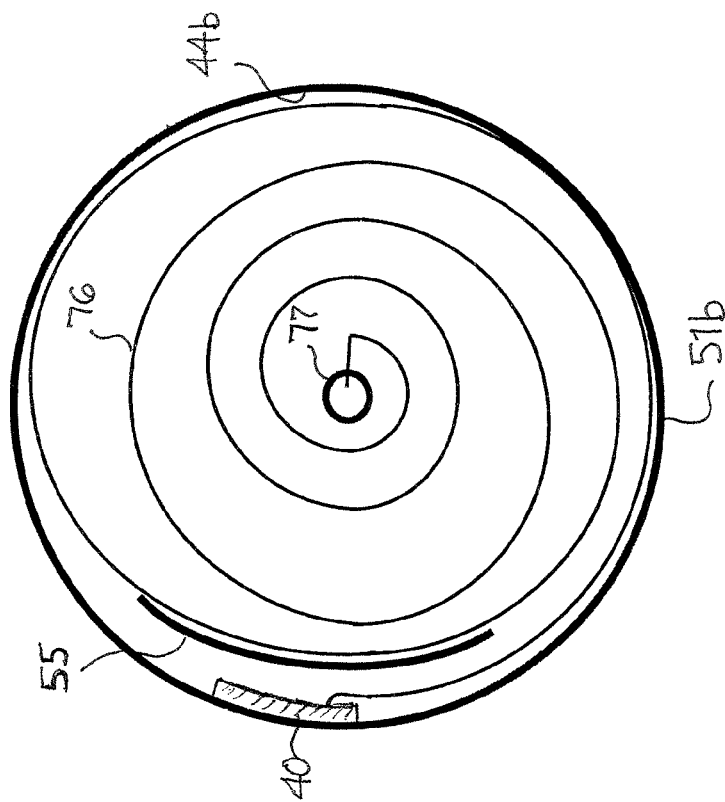
FIG. 16 is a top plan view of the housing shown in FIG. 14 with a spirally-wound FFC mounted therein.

FIG. 16 illustrates, in a top plan view, FFC 76 spirally wound around collar 77 within FFC chamber 44b in a slightly flattened or ovoid spiral configuration with a minor axis dimension similar to the diameter of circular chamber 44a in FIG. 13 and FIG. 15, and a major axis dimension that is larger than the diameter of chamber 44a. FFC 76 is illustrated edge-one in a loosely wound configuration with one end of FFC 76 attached to collar 77 and the other end of FFC 76 attached to circuit board 40, which is mounted between wall 51b and partition 55. Circuit board 40 provides a means for placing the cord reel in electrical connection with a telephone or other communication device, a gaming device, an IFE console, and the like, e.g., through a cord such as cord 65 shown in FIG. 6.

Because partition 55 does not extend all the way around the interior of the housing, FFC chamber 44b allows the FFC to adopt a slightly flattened or ovoid spiral shape when mounted in the chamber (e.g., as shown in FIG. 16). Chamber 44b provides an effectively larger space for the FFC to expand into when it is loosely wound around collar 77 than the space provided by FFC chamber 44a shown in FIG. 13 and FIG. 15, for housings having the same diameter. Surprisingly, the ovoid spiral shape adopted by the FFC illustrated in FIG. 16 has been found to ameliorate binding and twisting of the FFC during operation of the cord reel that can sometimes occur when the FFC is spirally wound within a substantially circular cylindrical chamber with a diameter of the same dimension as the minor axis dimension of the ovoid chamber, such as chamber 44a shown in FIG. 13 and FIG. 15.

As seen in FIG. 7, the latch pilot mechanism 200 is engaged with the latch mechanism 92 to prevent the latch mechanism 92 from operating. The lever 202 is operably arranged with the direction sensor 94 and with the cam wheel 204. The lever 202 includes a notched locking surface 220 that can be placed in contact with an opposing seat 222 of the direction sensor 94, as shown in FIG. 7. The locking surface 220 is engaged with the seat 222 such that the direction sensor 94 is placed in an inhibited position. In the inhibited position, the direction sensor 94 is disposed so that the teeth 87 of the internal gear portion 86 cannot contact the direction sensor 94 as the teeth 87 rotate, thereby preventing the latch mechanism 92 from operating.

The top teeth 250 of the cam wheel 204 are each configured to be engageable with a triangular-shaped cam driver 252 projecting from the rim 84 of the second wall 56 of the reel 52 and disposed approximately at the center of the dead zone 88 of the rim 84. The cam driver 252 can engage one top tooth 250a of the top teeth 250 of the cam wheel 204 to cause the cam wheel 204 to rotate 36 degrees, i.e., one-tenth of a revolution of the cam wheel 204, for each revolution of the reel 52. The cam driver 252 operates to rotate the cam wheel 204 in both the retraction direction 72 and an extraction direction 104, which is opposite to the retraction direction.

Referring to FIG. 7a, a bearing wall 228 projecting from the plate includes a resiliently flexible cam catch 232 extending therefrom. The cam catch 232 has a protrusion 234 at its free end that is operably arranged with the bottom gear portion 236 of the cam wheel 204. The cam catch 232 provides an indexing function to ensure that the cam wheel 204 rotates in a one-tenth-revolution increment for each revolution of the reel 52. The protrusion 234 is engaged with the bottom gear portion 236 of the cam wheel 204 and is disposed between a pair of adjacent bottom teeth 248a, 248b. When the cam driver 252 engages the cam wheel 204, the protrusion 234 flexes away from the bottom gear portion 236 and bears against one tooth 248b of the bottom teeth 248, allowing the cam wheel 204 to rotate. The cam wheel 204 rotates until the bottom tooth 248b upon which the protrusion 234 rides moves past the protrusion 234. The protrusion 234 then returns toward the bottom gear portion 236, lodging between the next pair of adjacent bottom teeth 248b, 248c that includes the bottom tooth 248 upon which the protrusion 234 just rode.

In FIG. 7a, the latch pilot mechanism 200 is shown engaged with the latch mechanism 92. The lever 202 of the latch pilot mechanism 200 includes a cam follower 240 that is operably arranged with the cam lobe 242 of the cam wheel 204. The cam lobe 242 is configured to prevent the operation of the latch mechanism 92 over a range of extracted cord length from zero to approximately eighteen inches. When the cam follower 240 is in contact with the minor diameter 270 of the cam lobe 242, the latch pilot mechanism 200 is engaged with the latch mechanism 92, thereby preventing the operation of the latch mechanism 92. When the cam follower 240 is in contact with the major diameter 272 of the cam lobe 240, the latch pilot mechanism 200 is disengaged from the latch mechanism 92, thereby allowing the latch mechanism 92 to operate normally.

The arc defined by the minor diameter 270 is at least 108 degrees, i.e., the arc is configured to encompass three positions of the bottom gear portion. From the cord being fully wound onto the reel 52, after three turns of the reel 52, equivalent to a length of extracted cord approximately eighteen inches long in this embodiment, the cam follower 240 is then located on the major diameter 272 of the illustrative cam lobe 242.

The lever 202 also includes an integral leaf spring 226. The bearing wall 228 projecting from the mounting plate 90 flexes the leaf spring 226, which in turn biases the lever 202 to rotate in an inhibit direction 230. The leaf spring 226 biases the lever 202 such that the locking surface 220 of the lever 202 is biased to move toward the seat 222 of the direction sensor 94 to interferingly engage the locking surface 220 with the seat 222, thereby preventing the latching function of the latch mechanism 92.

Figure 8:
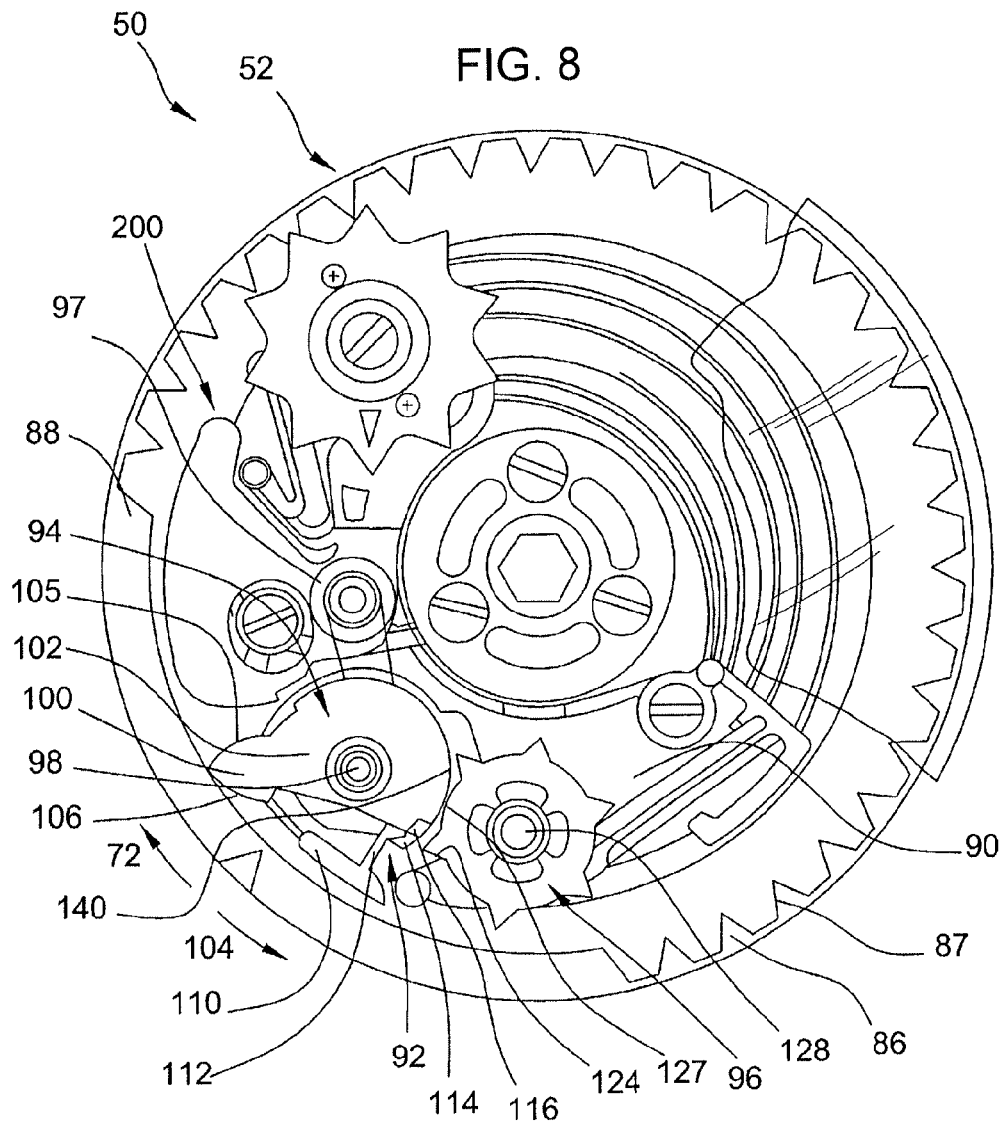
FIG. 8 is a top plan view of the cord reel assembly of the invention illustrating the latch pilot mechanism in a disengaged position allowing the latch mechanism to selectively operate.

Referring to FIG. 8, the latch pilot mechanism 200 is disengaged from the latch mechanism 92. With the latch pilot mechanism 200 disengaged from the latch mechanism 92, the direction sensor 94 can rotate in the retraction direction 72 and in the extraction direction 104. The direction sensor 94 is operably arranged with the teeth 87 of the internal gear portion 86 such that the direction sensor 94 can be moved between a retracted position and an extracted position. The direction sensor 94 moves between the retracted and the extracted positions according to the rotation of the reel 52. In other words, the direction sensor 94 is in a retracted position when the reel is rotating in the retraction direction 72 and in an extracted position when the reel 52 is rotating in the extraction direction 104. The direction sensor 94 has a nose 100 extending from a base 102. The nose 100 is configured to intermesh with the teeth 87 of the internal gear portion 86. The nose 100 includes a retraction side 105 and an extraction side 106.

As seen in FIG. 8, the direction sensor 94 is shown in a retracted position. The nose 100 is resting against the dead zone 88. In the retracted position, the nose 100 is pointed in the retraction direction 72. The base 102 includes a generally circular portion 140 having a radius that substantially conforms to the contour of the gap 127 of the gear wheel 96. In construction, the base 102 can rotate about the first post 98 without contacting any of the top teeth 124 of the gear wheel 96 when the gear wheel 96 is in a free position.

A resiliently flexible shaft 110 projects from the nose 100. A hook 112 projects from near the distal end of the shaft 10 and is engaged with a hook 114 projecting from the base 102. The hooks 112, 114 retain the shaft 110 such that the shaft 110 is free to rotate about the nose 100 over a range of travel between the body 102 at one end and the point where the hooks 112, 114 engage each other at the other end. The hooks 112, 114 act to aid in the position of the shaft 110 such that the shaft 110 can selectively engage the gear wheel 96 during the operation of the latch mechanism 92. A peg 116 projects from the base 102. The peg 116 is arranged to be selectively engageable with the gear wheel 96 to lock the direction sensor 94 in place, thereby achieving the latching feature of the latch mechanism 92.

The gear wheel 96 is operably arranged with the mounting plate 90 such that the gear wheel 96 is incrementally movable between alternating free and latch positions. In moving to the extracted position, the direction sensor 94 is configured to rotate the gear wheel 96 one position, thereby alternately moving the gear wheel from a free position to a latch position or vice versa. When in the latch position, the gear wheel 96 is arranged to lock the direction sensor 94 in a latch position, thereby achieving the latching feature of the latch mechanism 92. The gear wheel 96 is shown in a free position in FIG. 8.

Figure 8A:
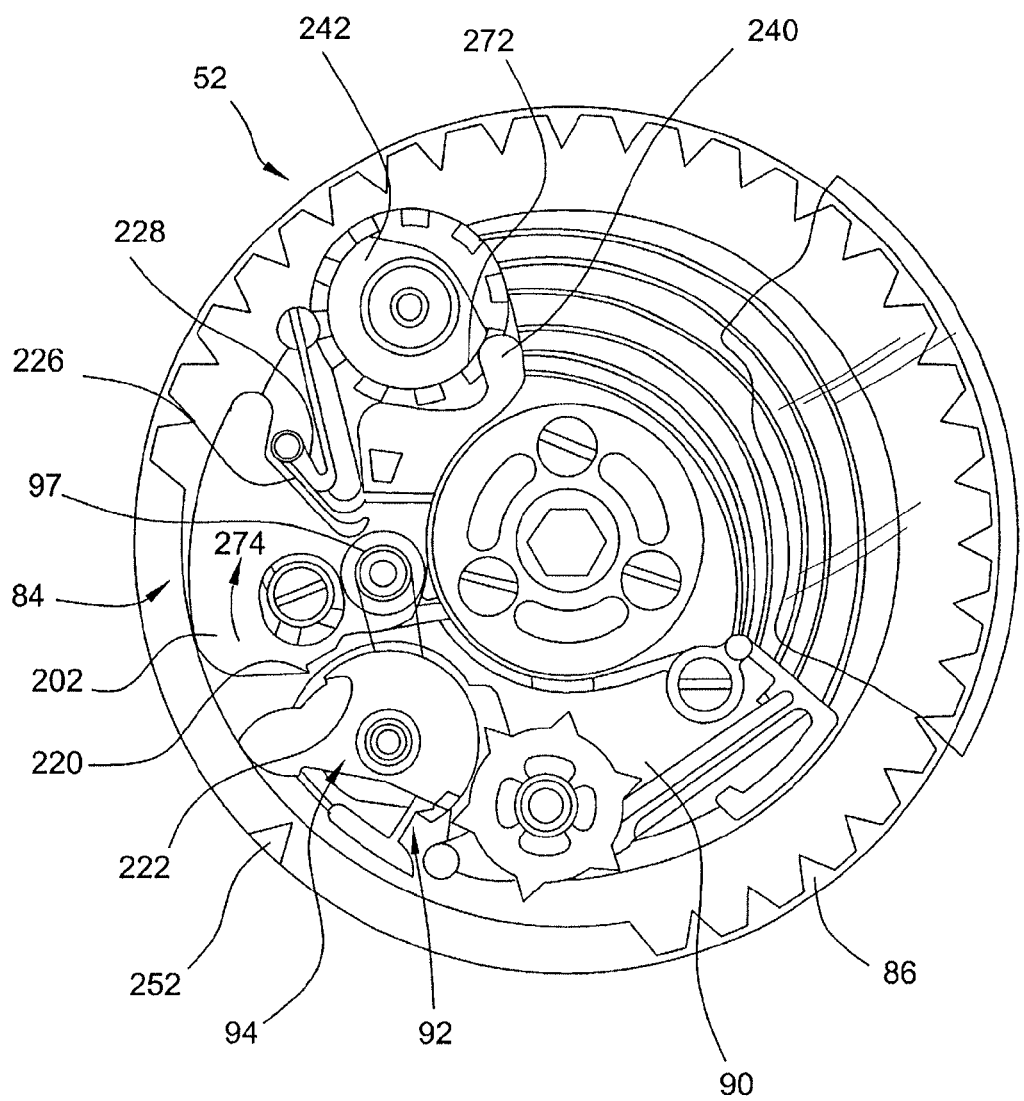
FIG. 8a is a top plan view of the cord reel assembly of the invention with the top portion of the cam wheel removed for illustrative purposes.

Referring to FIG. 8a, the repositioning of the cam follower 240 to the major diameter 272 resulted in the lever 202 rotating in a release direction 274 that disengaged the locking surface 220 of the lever 202 from the seat 222 of the direction sensor 94, thereby allowing the latch mechanism to function. The leaf spring 226 has been compressed an additional amount against the bearing wall 228 projecting from the mounting plate 90. The end of the spring 97 closest to the rim 84 has urged the direction sensor 94 toward the internal gear portion 86 of the rim 84 to the refracted position, wherein the latch mechanism 92 is operable.

Figure 9:
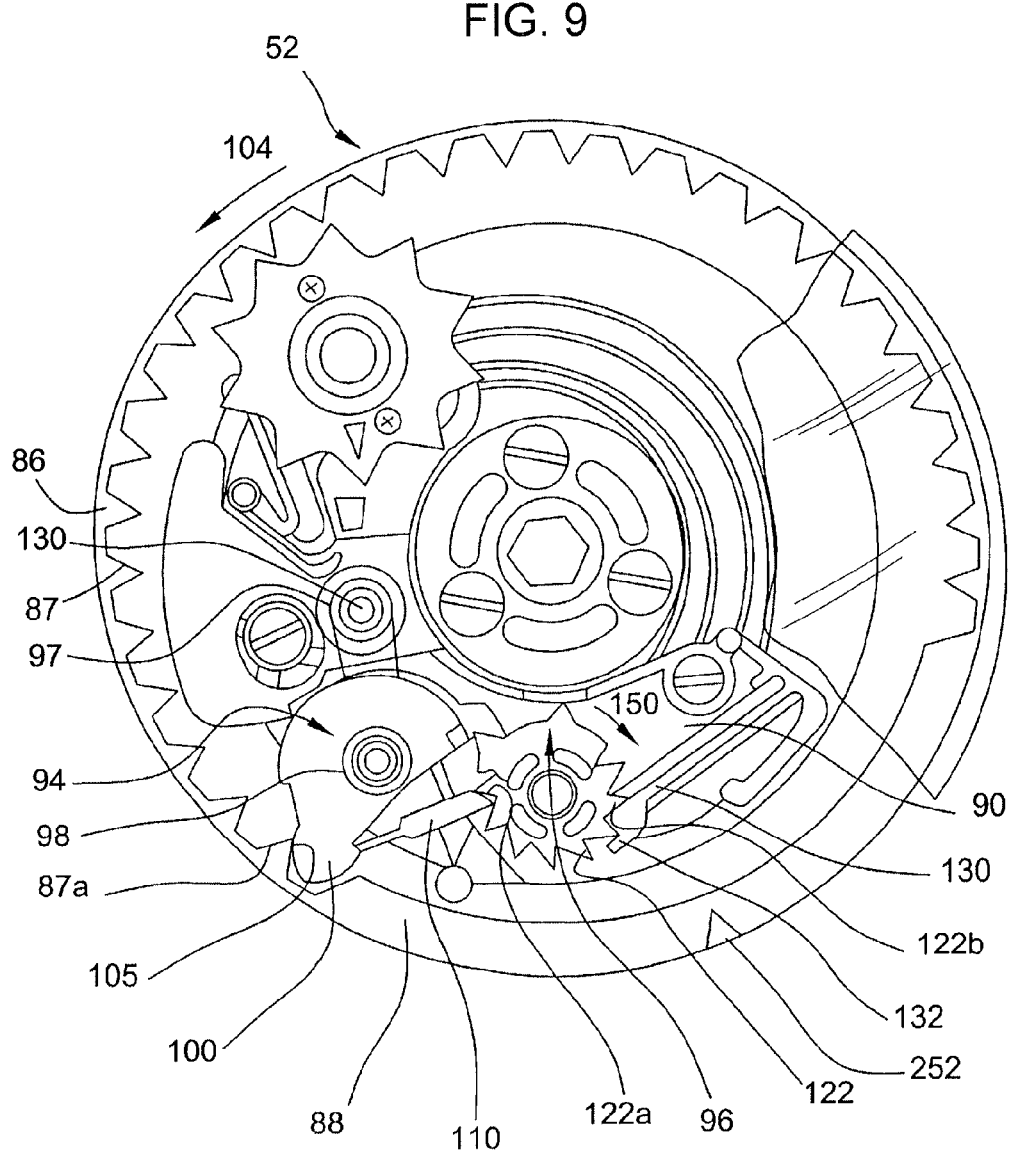
FIG. 9 is a top plan view of the cord reel assembly of the invention with a top portion of a gear wheel of the latch mechanism removed for illustrative purposes.

Referring to FIG. 9, the reel 52 has rotated a sufficient amount in the extraction direction 104 to cause the shaft 110 of the direction sensor 94 to contact one of the bottom teeth 122 of the gear wheel 96. The gear wheel 96 can rotate in an indexing direction 150 in one-twelfth revolution increments, alternating between a free position and a latch position. The mounting plate 90 includes a resiliently flexible gear catch 130 having a notched stop 132 at its free end. The gear catch 130 provides an indexing function to ensure that the gear wheel 96 rotates in a one-twelfth-revolution increment. The stop 132 of the mounting plate 90 is operably arranged with the bottom teeth 122 of the gear wheel 96. One of the bottom teeth 122 of the gear wheel 96 is seated in the stop 132. The stop 132 is configured to prevent the gear wheel 96 from rotating in a direction opposite the indexing direction 150. In FIG. 9, the gear wheel 96 is shown in a free position. As the direction sensor 94 continues to rotate in the extraction direction 104, the shaft 110 will cause the gear wheel 96 to rotate in the indexing direction 150 to move the gear wheel 96 to a latch position.

Figure 10:
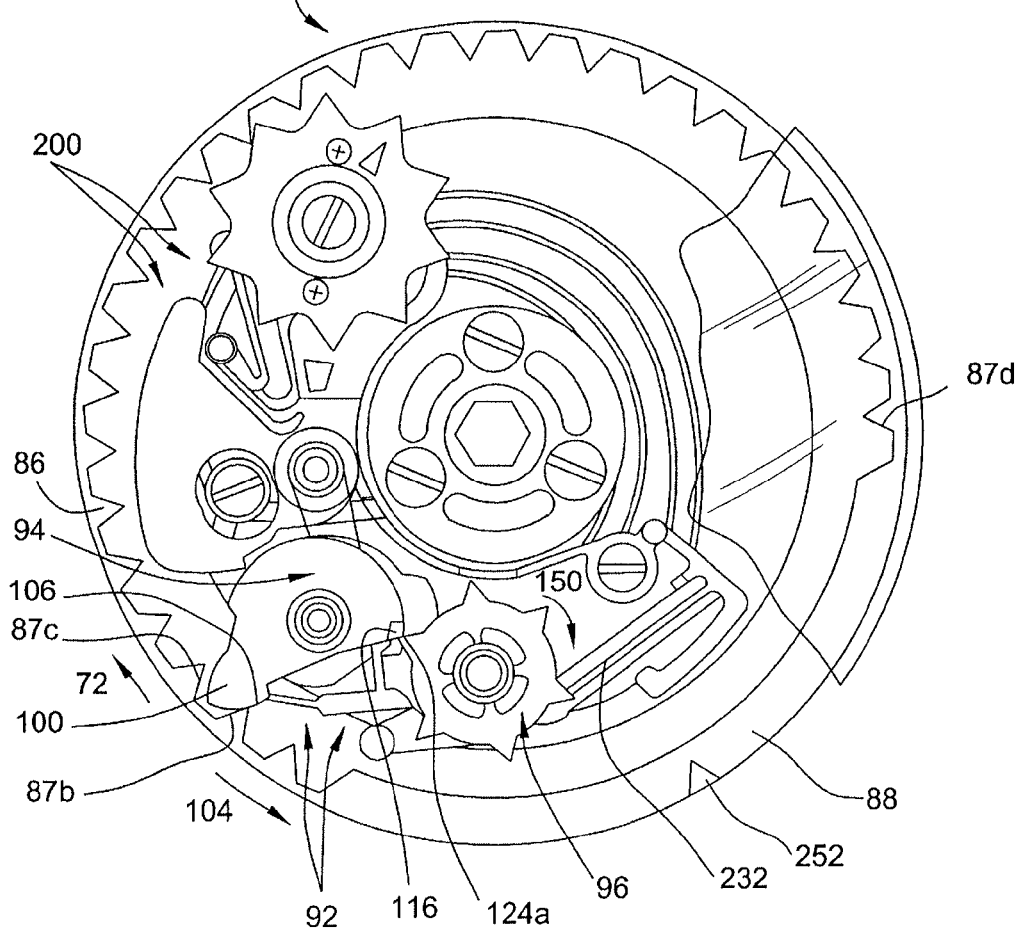
FIG. 10 is a top plan view of the cord reel assembly of the invention illustrating a direction sensor of the latch mechanism in a latch position.

Referring to FIG. 10, the latch mechanism 92 has latched the cord in a desired extended position. In this embodiment, the cord cannot be latched until the cord is extended greater than about eighteen inches from the reel, at which point the latch pilot mechanism 200 is disengaged from the latch mechanism 92. Of course, in other embodiments, the length of cord extended from the reel 52 necessary to disengage the latch pilot mechanism 200 from the latch mechanism 92 can be varied.

The direction sensor 94 is in a latched position. The gear wheel 96 is in a latch position. The gear catch 232 prevents the gear wheel 96 from rotating in a direction opposite the indexing direction 150. The peg 116 of the direction sensor 94 is in contact with one top tooth 124a of the top teeth 124. The engagement between the direction sensor 94 and the gear wheel 96 prevents the direction sensor from rotating in the retraction direction 72. The nose 100 is disposed between a pair of the teeth 87b, 87c of the internal gear portion 86 and prevents the retraction mechanism from operating. The cord is thus latched in place with a desired length extracted from the reel 52.

Referring to FIG. 7, in operation, starting with the cord fully retracted, the latch pilot mechanism 200 is engaged with the latch mechanism 92. At full cord retraction, the cam follower 240 is resting on the minor diameter 270 of the cam lobe 242, as shown in FIG. 7a. The direction sensor is in the inhibited position. Referring to FIG. 8, once a predetermined length of the cord is extracted from the reel 52, about eighteen inches in the illustrative embodiment of the cord reel assembly 50, the latch pilot mechanism 200 is disengaged from the latch mechanism 92. With the latch pilot mechanism 200 disengaged from the latch mechanism 92, the latch mechanism 92 can operate normally. The cam follower 240 is resting on the major diameter 272 of the cam lobe 242, as shown in FIG. 8a. The direction sensor 94 is in the retracted position. The nose 100 of the direction sensor 94 is in contact with the dead zone 88.

Referring to FIG. 9, the cord is payed-out an additional amount, rotating the reel 52, including the teeth 87 of the internal gear portion 86, in the extraction direction 104. The tooth 87a adjacent the dead zone 88 contacts the retraction side 105 of the nose 100, which in turn rotates about the first post 98 in the extraction direction 104 and moves toward an extracted position. The free end of the shaft 110 engages one bottom tooth 122a, causing the gear wheel 96 to rotate one-twelfth of a revolution in an indexing direction 150. Another one 122b of the bottom teeth 122 moves the catch 130 toward the rim of the reel 52 to allow the gear wheel 96 to rotate. Once the point of the tooth 122b moves past the stop 132, the catch 130 returns to its normal position such that the tooth 122b is seated in the stop 132. The catch 130 provides an indexing feature to ensure the gear wheel 96 rotates in a one-twelfth revolution increment for each pass of the shaft 110 that moves the gear wheel 96 in the indexing direction 150. The gear wheel 96 is placed in a latch position, as shown in FIG. 10.

Referring to FIG. 9, after the free end of the shaft 110 moves past the gear wheel 96, the end of the spring 97 that is closest to the center of the reel 52 acts to bias the nose 100 toward the internal gear portion 86 in the direction of the retracted position. As the teeth 87 of the internal gear portion 86 rotate relative to the mounting plate 90, the teeth 87 contact the nose 100. The spring 97 urges the nose 100 back into contact with the next one of the teeth 87. This interplay between the spring 97, the direction sensor 94, and the teeth 87 creates an audible "clicking" feature and readies the direction sensor 94 to respond to a change in the rotation of the reel 52.

Referring to FIG. 10, because the user has extracted a length of cord greater than the predetermined length required to disengage the pilot latch mechanism from the latch mechanism, the latch mechanism operates normally. Once the user extracts the cord to a desired length, the cord can be released. Once released, the retraction mechanism in the form of a spring acts to retract the cord. In FIG. 10, the reel 52 has rotated in the retraction direction 72. The tooth 87b of the internal gear portion 86 that had just passed the nose 100 moving in the extraction direction 104 is brought into contact with the extraction side 106 of the nose 100. The direction sensor 94 in turn rotates in the retraction direction 72 until the peg 116 contacts one tooth 124a of the top teeth 124.

As seen in FIG. 10a, the catch 130 prevents the bottom tooth 122c seated in the stop 132 from rotating in a direction opposite the indexing direction 150, thereby fixing the direction sensor 94 in place. The nose 100 is disposed between a pair of the teeth 87b, 87c of the internal gear portion 86 and prevents the retraction mechanism from operating. The direction sensor 94 is in a latched position. The cord is thus latched in place with a desired length extracted from the reel 52.

As an added feature, the length of the cord and the position and size of the dead zone 88 can be configured such that upon full cord extraction from the reel 52, the nose 100 of the direction sensor 94 is in contact with the dead zone 88. In such a case the retraction mechanism will operate to retract the cord until the nose engages the tooth 87d adjacent the dead zone 88. The tooth 87d contacts the nose 100 to place the nose in a latch position. By configuring the dead zone 88 such that the cord must retract slightly from the fully extended position before allowing the nose 100 to be placed in a latch position, it is ensured that there will be a slight amount of cord remaining on the reel 52 sufficient to rotate the gear wheel 96 to a free position to unlatch the cord.

Referring to FIG. 11, to disengage the latch mechanism 92, the user can extract a length of cord from the reel 52 sufficient to cause the adjacent tooth 87c on the retraction side 105 to contact the nose 100, which, in turn, causes the shaft 110 to rotate. The shaft 110 contacts one of the bottom teeth of the gear wheel 96 to cause the gear wheel 96 to rotate one-twelfth of a revolution, positioning the gear wheel 96 in a free position such that the circular portion 140 of the body 102 can rotate freely with respect to the gear wheel 96. Upon release of the cord, the other adjacent tooth 87b of the internal gear portion 86 rotates the nose 100 to a retracted position. The retraction mechanism takes up the cord, which is wound onto the reel 52. During retraction of the cord, the spring 97 urges the nose 100 of the direction sensor 94 toward the teeth 87 of the internal gear portion 86.

It will be understood that the latch mechanism 92 can be triggered at any time during cord retraction, until the length of the cord is less than a predetermined length, here eighteen inches, by extracting the required length of cord to toggle the nose of the direction sensor to the extracted position, thereby rotating the gear wheel to a latch position. The latch mechanism will continue to be operable until the cord is retracted to a length less than the predetermined length, i.e., eighteen inches, at which time the cam follower returns to the minor diameter of the cam lobe to prevent the operation of the latch mechanism. The lever 206 is urged to rotate toward the direction sensor 94 by the leaf spring 226. The locking surface 220 engages the seat 222 and the direction sensor 94, in turn, rotates to the inhibited position.

Thus, in operation, the latch pilot mechanism 200 operates to prevent the latch mechanism 92 from operating over a desired range of travel. In use, a user extracts a cord fully wound onto a reel. After three revolutions, for example, of the reel, the latch pilot mechanism 200 is disengaged from the latch mechanism, and the latch mechanism is free to operate normally. Upon return of the cord onto the reel, the latch mechanism continues to operate normally until less than the predetermined length, i.e., eighteen inches, of cord is extended from the reel. At that point the latch pilot mechanism engages the latch mechanism and prevents the latch mechanism from operating.

Figure 12:
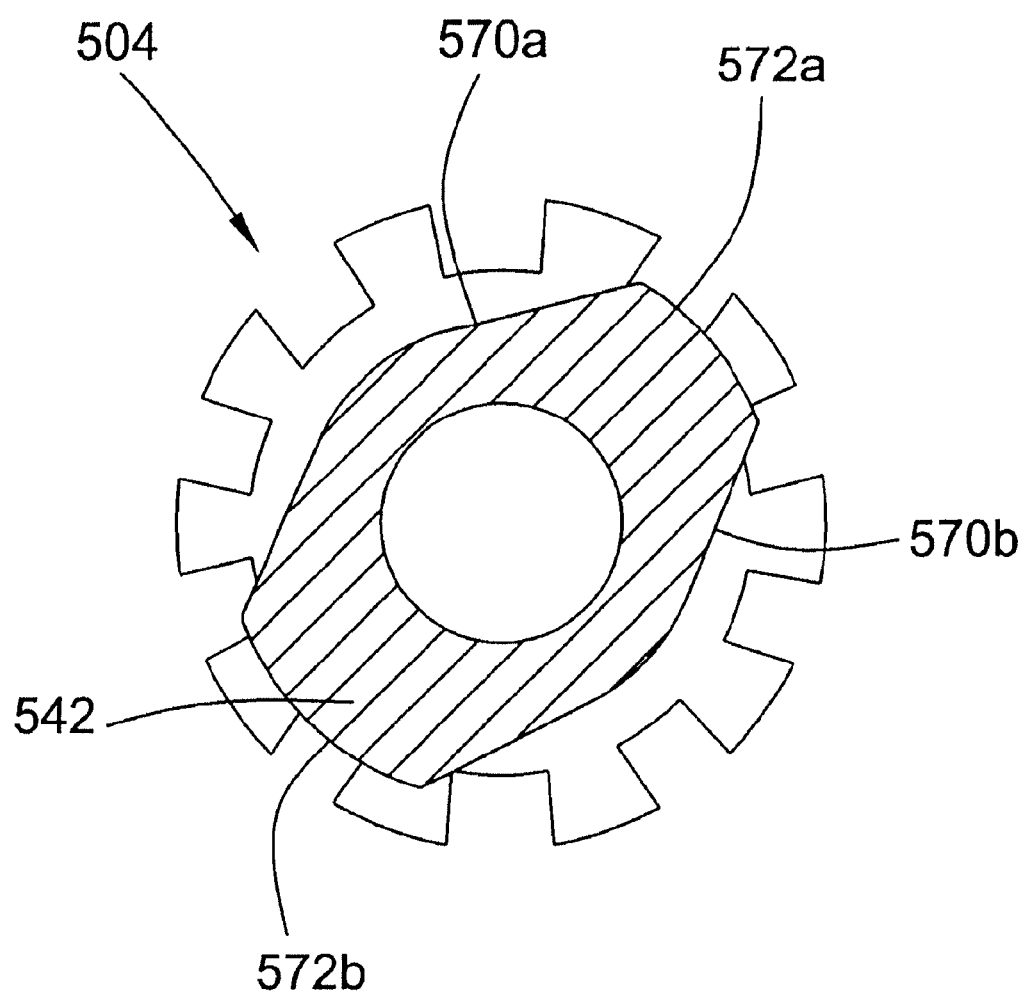
FIG. 12 is a cross-sectional view of another embodiment of a cam wheel.

It will be understood that the cam wheel can take on various configurations. For example, it will be understood that in other embodiments the minor diameter can define arcs of other sizes. Further, the cam lobe can be varied to include a plurality of minor diameters and/or a plurality of major diameters. For instance, referring to FIG. 12, a cam wheel 504 is shown that can allow the latch mechanism to operate at two distinct extensions of the cord. The cam wheel 504 includes a cam lobe 542 having two minor diameters 570a, 570b and two major diameters 572a, 572b. The two minor diameters provide two separate ranges of cord extraction over which the pilot mechanism can operate to prevent the operation of the latch mechanism.

In other embodiments, the number of the bottom teeth and the top teeth of the cam wheel can be varied to change the length of extracted cord that is necessary to toggle the latch pilot mechanism.

Furthermore, any suitable cord reel and retraction mechanism may be used. The latch pilot mechanism and latch mechanism of the present invention can be used with any cord reel that includes a cord that is desired to be retractable. Similarly, other latch mechanisms can be adapted to be used with a latch pilot mechanism.

All references, including publications, patent applications and patents, cited herein are hereby incorporated by reference to the same extent as if each reference were individually and specifically indicated to be incorporated by reference and were set forth in its entirety herein. The use of the terms "a" and "an" and "the" and similar referents in the context of describing the present invention (especially in the context of the following claims) are to be construed to cover both the singular and the plural, unless otherwise indicated herein or clearly contradicted by context. The use of terms "including", "having" and "comprising" and like terms are to be construed as open ended terms, meaning including, but not limited to, unless otherwise indicated, or clearly contradicted by context, herein. The use of any and all examples, or exemplary language (e.g., "such as") provided herein is intended merely to better illuminate the present invention and does not pose a limitation on the scope of the claimed invention. No language in the specification should be construed as indicating any non-claimed element as essential to the practice of the invention.

The foregoing is an integrated description of the invention as a whole, not merely of any particular element or facet thereof. The description describes "preferred embodiments" of this invention, including the best mode known to the inventors for carrying it out. Of course, upon reading the foregoing description, variations of those preferred embodiments will become obvious to those of ordinary skill in the art. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is possible unless otherwise indicated herein or otherwise clearly contradicted by context.

The embodiments of the invention in which an exclusive property or privilege is claimed are defined as follows:

1. A retractable cord reel assembly comprising a cord reel including a spiral coil of flat flexible cable (FCC) in operable connected to a spool of round cord material for data and power transmission;
   wherein the FCC comprises:
   a ribbon of generally parallel wires embedded in a non-conductive polymeric matrix, the FFC having two ends, an end to end length, a width perpendicular to the length in a plane defined by the wires, and a thickness in a direction perpendicular to the length and width;
   the embedded wires comprising two or more power transmission wires and two or more data transmission wires; each data wire in the FFC being spaced from any adjacent wire by a portion of the polymeric matrix;
   the FFC comprises non-shielded end regions flanking a shielded middle region that includes a shielding layer on at least one side thereof; and
   a non-conductive coating over the shielding layer;
   wherein the shielding layer comprises a metal-containing coating, foil, or film, and optionally is in electrical contact with at least one of the data transmission wires at one or more spaced locations along the length of the FFC; the polymeric matrix is absent in a portion of the non-shielded end regions; the power transmission wires have a larger cross-sectional area relative to the data transmission wires; and the power transmission wires are flattened in the plane defined by the wires such that they have a greater width than thickness; the power transmission wires in the FFC are operably connected to power transmission wires in the cord material and the data transmission wires of the FFC are operably connected to data transmission wires in the cord material, such that the cord and FFC together form a single power and data transmission pathway; and
   wherein:
   the cord reel is defined by a first generally circular plate spaced from a second circular plate by a hub; the first and second plates having substantially the same diameter and being substantially parallel to each other, with a collar projecting from the first circular plate away from the hub and along the axis of rotation thereof, such that the collar rotates with the reel;
   the cord reel is rotatably mounted in a housing such that the reel is rotatable about an axis centered on and running through the hub;
   a length of the cord material is wound around the hub, one end of the cord material being attached to the hub;
   one end of the FFC is attached to the collar with the FFC spirally wound around the collar, and the other end of the FFC is attached to a circuit board mounted on or in the housing, such that when the reel rotates, the number of spiral turns of the FFC increases or decreases depending on the direction of rotation;
   the cord reel is biased by a spring such that when a tension is applied to the end of the cord material that is not connected to the hub, the cord reel rotates against the bias of the spring as the cord material is unwound, and when the tension is released, the cord material is re-wound onto the cord reel due to the bias of the spring;
   a latch mechanism mounted to the housing, which is operably connected to the reel, the latch mechanism being is selectively operable to latch the reel in a stationary position to prevent rewinding of the cord material; and
   a pilot mechanism mounted to the housing, which is operably engageable with the latch mechanism to prevent the latch mechanism from operating.

2. The cord reel assembly of claim 1, wherein:
   the cord reel includes an internal gear portion on the second plate;
   the latch mechanism comprises a direction sensor operably arranged with a gear wheel, the direction sensor and the gear wheel being operably arranged such that the direction sensor is engageable with the internal gear portion of the reel to achieve latching of the reel; and
   the pilot mechanism is moveable between a first and second position, wherein in the first position the pilot mechanism prohibits the functioning of the latch mechanism, and in the second position the latch mechanism is operable.

3. The cord reel assembly of claim 2, further comprising a gear catch, the gear catch being operably arranged with the gear wheel to permit the gear wheel to incrementally move between a first position and a second position; wherein when the gear wheel is in the first position, the direction sensor can engage the internal gear portion of the reel to activate the latch mechanism, and when the gear wheel is in the second position, the reel is free to rotate with respect to the latch mechanism in a retraction direction for winding the cord material back onto the reel.

4. The cord reel assembly of claim 1, wherein the FFC adopts an ovoid spiral configuration when the FFC is loosely wound around the collar.

5. The cord reel assembly of claim 1, in which a curved partition is included within the housing for the FFC to deflect the FFC into an ovoid spiral configuration when the FFC is loosely wound around the collar.

6. The cord reel assembly of claim 1, wherein the FFC comprises two to six power transmission wires and two to ten data transmission wires.

7. The cord reel assembly of claim 6, wherein the data transmission wires and the power transmission wires of the FFC are symmetrically disposed across the width of the FFC.

8. The cord reel assembly of claim 1, wherein the shielding layer is present on only one side of the FFC.

9. The cord reel assembly of claim 1, wherein the shielding layer comprises a metal-containing coating or paint.

10. The cord reel assembly of claim 1, wherein the shielding layer comprises a coating of silver paint.

11. The cord reel assembly of claim 1, wherein the polymeric matrix comprises two or more polymer sheets laminated together around the data transmission and power transmission wires.

12. The cord reel assembly of claim 1, wherein the polymeric matrix comprises a polyester.

13. The cord reel assembly of claim 1, wherein the shielding layer electrically contacts at least one of the data transmission wires of the FFC through one or more aperture that is partially cut through the polymeric matrix to the data transmission wire on the same side of the FFC as the shielding layer.

14. A flat flexible cable (FFC) comprising:
  a ribbon of generally parallel wires embedded in a non-conductive polymeric matrix, the FFC having two ends, an end to end length, a width perpendicular to the length in a plane defined by the wires, and a thickness in a direction perpendicular to the length and width;
  the embedded wires comprising two or more power transmission wires and two or more data transmission wires; each data wire in the FFC being spaced from any adjacent wire by a portion of the polymeric matrix;
  the FFC comprises non-shielded end regions flanking a shielded middle region that includes a shielding layer on at least one side thereof; and
  a non-conductive coating over the shielding layer;
  wherein the shielding layer comprises a metal-containing coating, foil, or film, and optionally is in electrical contact with at least one of the data transmission wires at one or more spaced locations along the length of the FFC; the polymeric matrix is absent in a portion of the non-shielded end regions; the power transmission wires have a larger cross-sectional area relative to the data transmission wires; and the power transmission wires are flattened in the plane defined by the wires such that they have a greater width than thickness.

15. The FFC of claim 14, wherein the FFC comprises two to six power transmission wires and two to ten data transmission wires.

16. The FFC of claim 15, wherein the data transmission wires and the power transmission wires are symmetrically disposed across the width of the FFC.

17. The FFC of claim 14, wherein the shielding layer is present on only one side of the FFC.

18. The FFC of claim 14, wherein the shielding layer comprises a metal-containing coating or paint.

19. The FFC of claim 14, wherein the shielding layer comprises a coating of silver paint.

20. The FFC of claim 14, wherein the polymeric matrix comprises two or more polymer sheets laminated together around the data transmission and power transmission wires.

21. The FFC of clam 14, wherein the polymeric matrix comprises a polyester.

22. The FFC of claim 14, wherein the shielding layer electrically contacts at least one of the data transmission wires through one or more apertures that is partially cut through the polymeric matrix to the data transmission wire on the same side of the FFC as the shielding layer.

23. A method of manufacturing the FFC of claim 14, comprising the steps of:
  passing generally parallel wires between one or more rollers to establish a uniform thickness of the conductors; the wires initially comprising two or more power transmission precursor wires having a first diameter and two or more data transmission wires having a second diameter that is smaller than the first diameter;
  disposing these generally parallel wires between two or more polymeric sheets to form a pre-laminate structure;
  passing the pre-laminate-structure through opposed rollers that apply sufficient pressure to the pre-laminate structure to press the polymer sheets together to form an intermediate cable structure;
  optionally cutting apertures from one side of the intermediate cable structure in the vicinity of at least one of the data transmission wires to expose the wire on that one side;
  applying a shielding layer of a metal-containing coating to one side of the FFC, the shielding layer being applied on the side of the cable where the apertures have been cut when apertures are present; and
  applying a non-conducting coating over the shielding layer.

* * * * *